(12) United States Patent
Kopp

(10) Patent No.: US 10,197,736 B2
(45) Date of Patent: Feb. 5, 2019

(54) POLARIZATION MAINTAINING OPTICAL FIBER ARRAY

(71) Applicant: Chiral Photonics, Inc., Pine Brook, NJ (US)

(72) Inventor: Victor Il'ich Kopp, Fair Lawn, NJ (US)

(73) Assignee: Chiral Photonics, Inc., Pine Brook, NJ (US)

( * ) Notice: Subject to any disclaimer, the term of this patent is extended or adjusted under 35 U.S.C. 154(b) by 91 days.

(21) Appl. No.: 15/374,854

(22) Filed: Dec. 9, 2016

(65) Prior Publication Data

US 2017/0219774 A1    Aug. 3, 2017

Related U.S. Application Data

(60) Provisional application No. 62/265,390, filed on Dec. 9, 2015.

(51) Int. Cl.
| | |
|---|---|
| *G02B 6/28* | (2006.01) |
| *G02B 6/024* | (2006.01) |
| *G02B 6/04* | (2006.01) |
| *G02B 5/30* | (2006.01) |
| *G02B 6/02* | (2006.01) |
| *G02B 6/27* | (2006.01) |
| *G02B 6/24* | (2006.01) |
| *G02B 6/30* | (2006.01) |
| *G02B 6/287* | (2006.01) |

(52) U.S. Cl.
CPC ......... *G02B 6/2843* (2013.01); *G02B 5/3016* (2013.01); *G02B 6/024* (2013.01); *G02B 6/02042* (2013.01); *G02B 6/04* (2013.01); *G02B 6/24* (2013.01); *G02B 6/2706* (2013.01); *G02B 6/2766* (2013.01); *G02B 6/287* (2013.01); *G02B 6/305* (2013.01)

(58) Field of Classification Search
None
See application file for complete search history.

(56) References Cited

U.S. PATENT DOCUMENTS

| | | | |
|---|---|---|---|
| 6,301,400 | B1 | 10/2001 | Sanders |
| 6,396,859 | B1 | 5/2002 | Kopp et al. |
| 6,404,789 | B1 | 6/2002 | Kopp et al. |

(Continued)

FOREIGN PATENT DOCUMENTS

| | | |
|---|---|---|
| JP | 2015-152774 | 8/2015 |
| WO | WO 2002/073247 A2 | 9/2002 |

(Continued)

OTHER PUBLICATIONS

International Search Report and Written Opinion of PCT/US2016/065962 dated Mar. 16, 2017 in 17 pages.

(Continued)

*Primary Examiner* — Chad H Smith
(74) *Attorney, Agent, or Firm* — Knobbe, Martens, Olson & Bear, LLP

(57) ABSTRACT

Advantageously, at least one embodiment of the present disclosure comprises a polarization maintaining PROFA ("PM-PROFA") coupler in which the polarization axes of the individual vanishing core waveguides thereof are oriented or aligned without the need to adjust the orientation of each individual VC waveguide.

20 Claims, 15 Drawing Sheets

(56) References Cited

U.S. PATENT DOCUMENTS

| | | |
|---|---|---|
| 6,411,635 B1 | 6/2002 | Kopp et al. |
| 6,671,293 B2 | 12/2003 | Kopp et al. |
| 6,678,297 B2 | 1/2004 | Kopp et al. |
| 6,721,469 B2 | 4/2004 | Kopp et al. |
| 6,741,631 B2 | 5/2004 | Kopp et al. |
| 6,744,943 B2 | 6/2004 | Kopp et al. |
| 6,792,169 B2 | 9/2004 | Kopp et al. |
| 6,839,486 B2 | 1/2005 | Kopp et al. |
| 6,875,276 B2 | 4/2005 | Shibayev et al. |
| 6,891,622 B2 | 5/2005 | Dyott |
| 6,891,992 B2 | 5/2005 | Kopp et al. |
| 6,925,230 B2 | 8/2005 | Kopp et al. |
| 7,009,679 B2 | 3/2006 | Kopp et al. |
| 7,095,911 B2 | 8/2006 | Kopp et al. |
| 7,142,280 B2 | 11/2006 | Kopp et al. |
| 7,242,702 B2 | 7/2007 | Kopp et al. |
| 7,308,173 B2 | 12/2007 | Kopp et al. |
| 7,463,800 B2 | 12/2008 | Kopp et al. |
| 7,983,515 B2 | 7/2011 | Zhang et al. |
| 8,218,921 B2 | 7/2012 | Kopp et al. |
| 8,326,099 B2 | 12/2012 | Singer et al. |
| 8,457,456 B2 | 6/2013 | Kopp et al. |
| 8,463,094 B2 | 6/2013 | Kopp et al. |
| 8,712,199 B2 | 4/2014 | Kopp et al. |
| 8,948,547 B2 | 2/2015 | Kopp |
| 2002/0003827 A1 | 1/2002 | Genack et al. |
| 2002/0069676 A1 | 6/2002 | Kopp et al. |
| 2002/0118710 A1 | 8/2002 | Kopp et al. |
| 2002/0172461 A1 | 11/2002 | Singer et al. |
| 2003/0118265 A1* | 6/2003 | Kopp ................ G02B 6/02085 385/11 |
| 2003/0118285 A1 | 6/2003 | Kopp et al. |
| 2004/0145704 A1 | 7/2004 | Kopp et al. |
| 2008/0098772 A1 | 5/2008 | Kopp et al. |
| 2008/0170823 A1 | 7/2008 | Gonthier |
| 2009/0324159 A1 | 12/2009 | Kopp et al. |
| 2010/0002983 A1 | 1/2010 | Kopp et al. |
| 2010/0158438 A1 | 6/2010 | Churikov et al. |
| 2011/0292676 A1 | 12/2011 | Weiner et al. |
| 2011/0293219 A1 | 12/2011 | Weiner et al. |
| 2012/0189241 A1 | 7/2012 | Kopp et al. |
| 2012/0189242 A1* | 7/2012 | Kopp ..................... G02B 6/274 385/11 |
| 2012/0257857 A1 | 10/2012 | Kopp et al. |
| 2013/0121641 A1 | 5/2013 | Singer et al. |
| 2013/0188174 A1 | 7/2013 | Kopp et al. |
| 2013/0188175 A1 | 7/2013 | Kopp et al. |
| 2013/0216184 A1 | 8/2013 | Kopp et al. |
| 2014/0294345 A1 | 10/2014 | Kopp et al. |
| 2015/0212274 A1 | 7/2015 | Kopp |
| 2015/0234120 A1 | 8/2015 | Uemura et al. |
| 2015/0309261 A1 | 10/2015 | Kobyakov et al. |
| 2017/0108650 A1 | 4/2017 | Weiner et al. |

FOREIGN PATENT DOCUMENTS

| | | |
|---|---|---|
| WO | WO 2006/046947 A2 | 5/2006 |
| WO | WO 2008/080174 A1 | 7/2008 |
| WO | WO 2017/053479 A1 | 3/2017 |

OTHER PUBLICATIONS

International Preliminary Report on Patentability of PCT/US2016/065962 dated Jun. 12, 2018 in 14 pages.

* cited by examiner

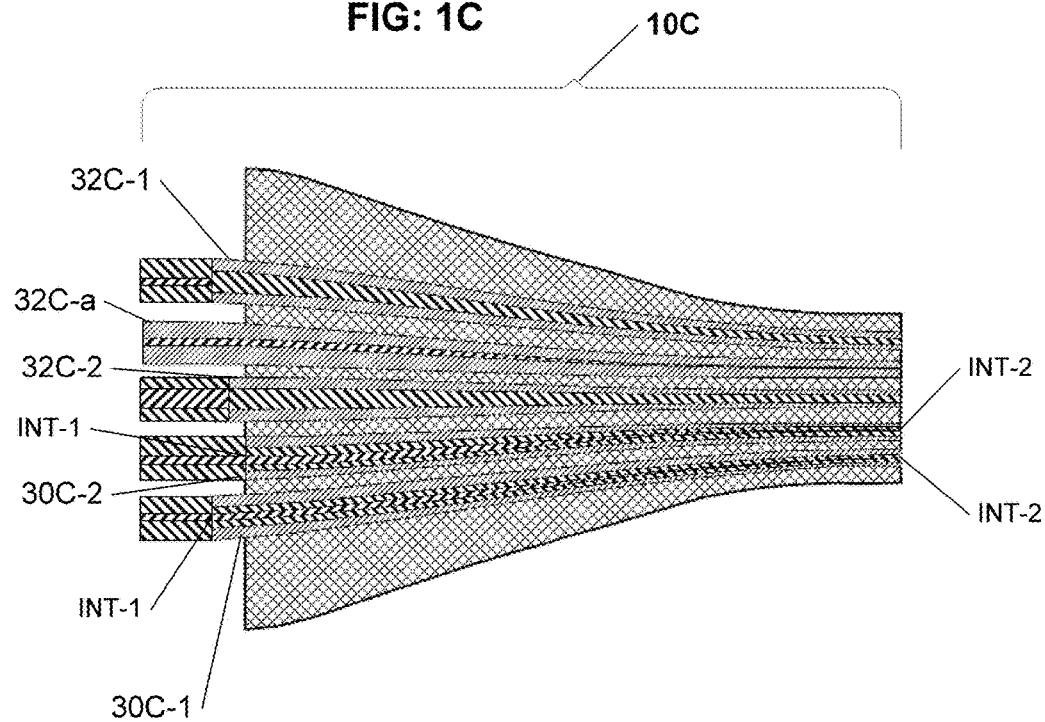
FIG: 1C
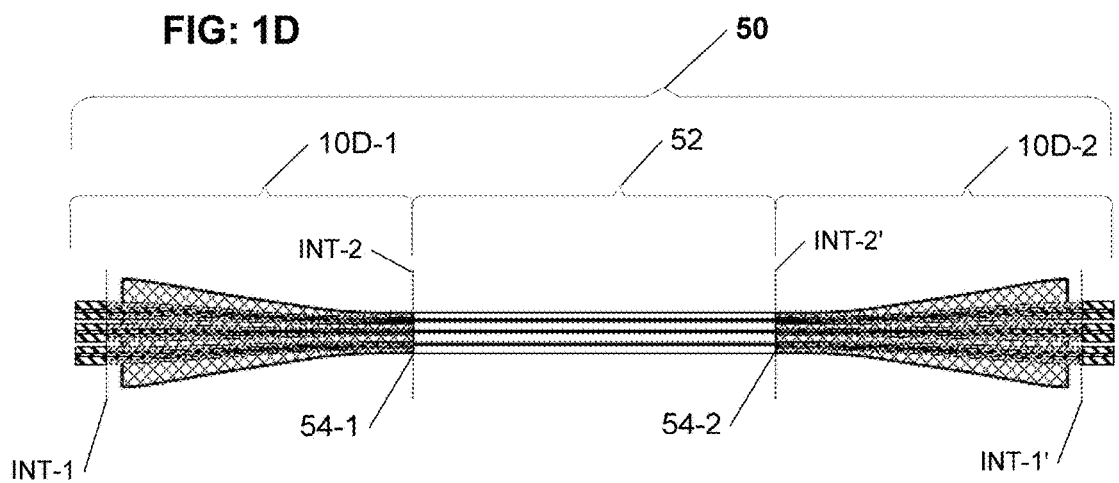
FIG: 1D

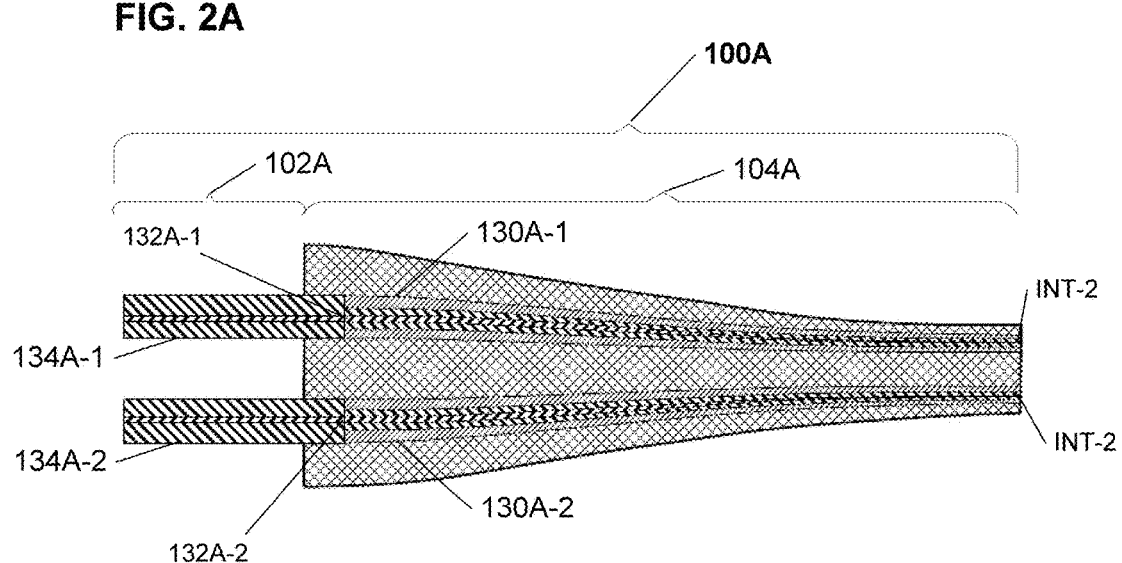
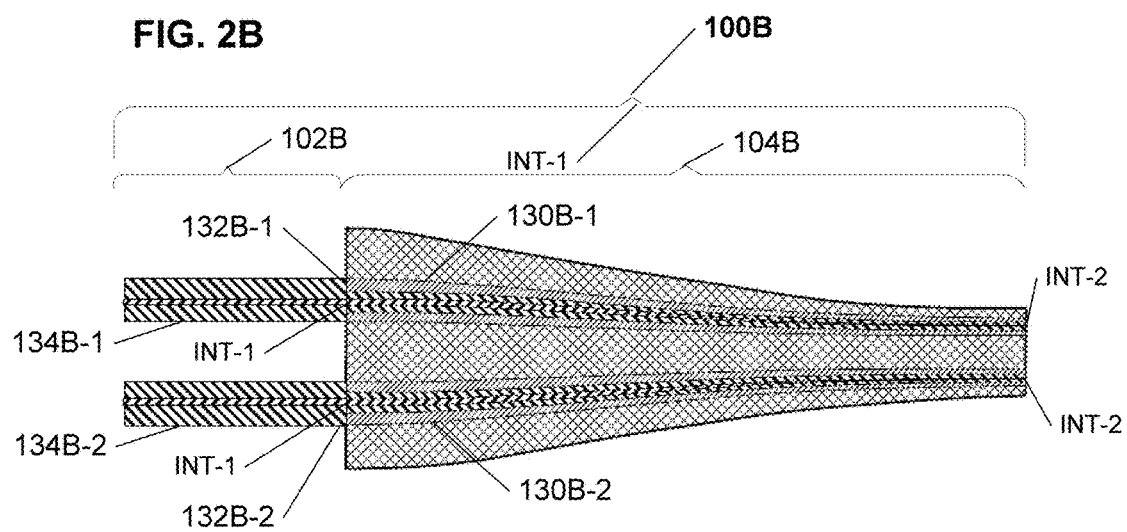

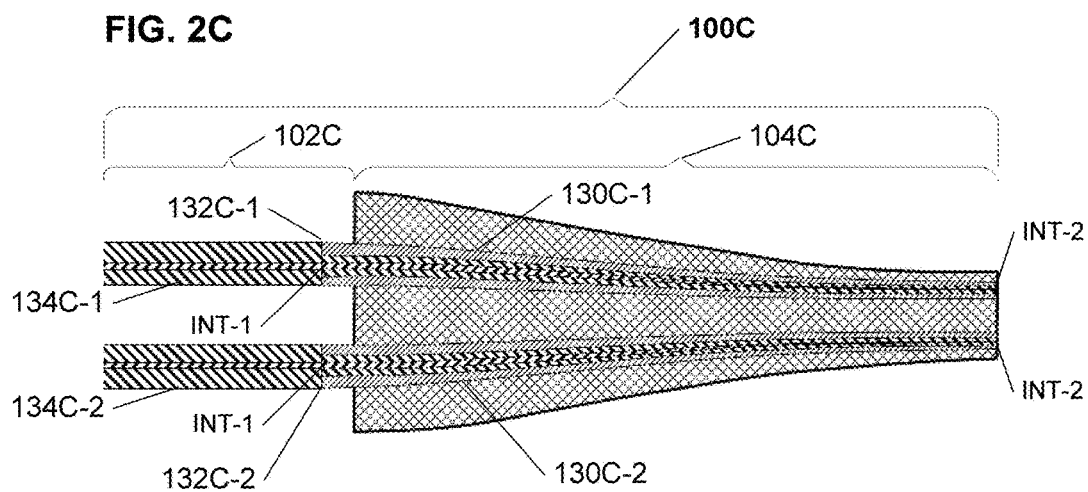
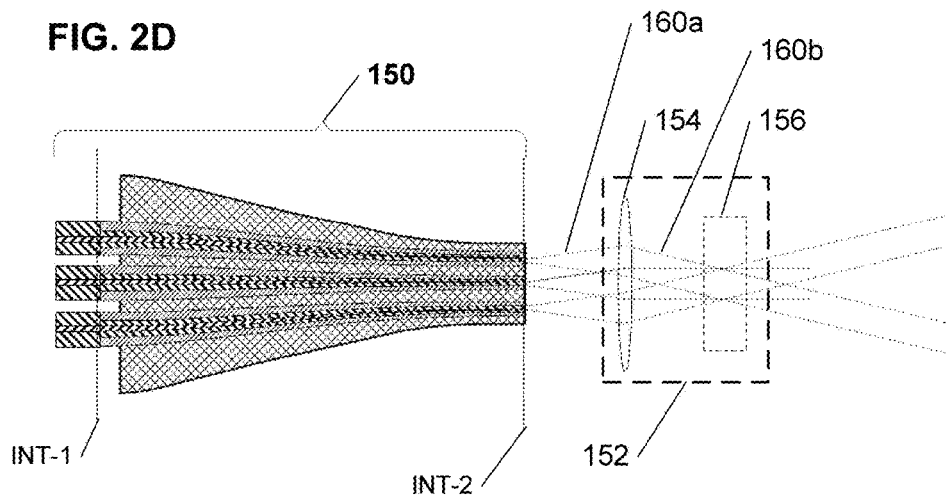

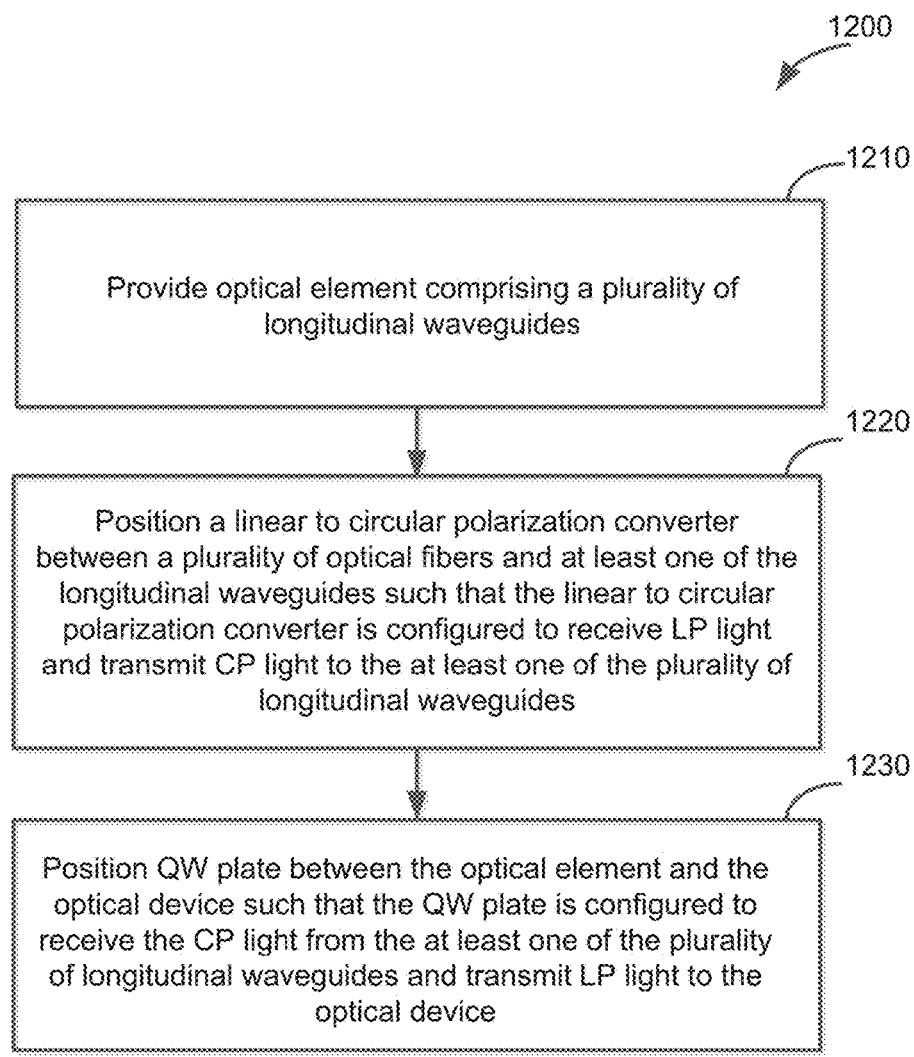

POLARIZATION MAINTAINING OPTICAL FIBER ARRAY

INCORPORATION BY REFERENCE TO ANY PRIORITY APPLICATIONS

This application claims the benefit of priority of U.S. Provisional Application No. 62/265,390, entitled "POLARIZATION MAINTAINING OPTICAL FIBER ARRAY," filed Dec. 9, 2015, the entire disclosure of which is expressly incorporated herein by reference.

BACKGROUND

Field of the Invention

The present disclosure relates generally to an optical coupler array for coupling, e.g., a plurality of optical fibers to at least one optical device. Some embodiments can relate generally to high power single mode laser sources, and to devices for coherent combining of multiple optical fiber lasers to produce multi-kilowatt single mode laser sources. Some embodiments may relate to phase locked optical fiber components of a monolithic design that may fabricated with a very high degree of control over precise positioning of even large quantities of plural waveguides, and that may potentially be configurable for increasing or optimization of the components' fill factor (e.g., of the ratio of the mode field diameter of each waveguide at the "output" end thereof, to the distance between neighboring waveguides). The optical fiber array can be a polarization maintaining optical fiber array that can orient or control the orientation of the polarization axes of individual optical fibers (e.g., permit alignment of all polarization axes of individual optical fibers of the components in some instances) without the need for adjustment of orientation of individual fibers.

Description of the Related Art

Optical waveguide devices are useful in various high technology industrial applications, and especially in telecommunications. In recent years, these devices, including planar waveguides, and two or three dimensional photonic crystals are being employed increasingly in conjunction with conventional optical fibers. In particular, optical waveguide devices based on high refractive index contrast or high numerical aperture (NA) waveguides are advantageous and desirable in applications in which conventional optical fibers are also utilized. However, there are significant challenges in interfacing optical high NA waveguide devices, including chiral optical fiber devices, with conventional low index contrast optical fibers. For example, in some cases, at least two major obstacles may be encountered: (1) the difference between the sizes of the optical waveguide device and the conventional fiber (especially with respect to the differences in core sizes), and (2) the difference between the NAs of the optical waveguide device and the conventional fiber. Failure to properly address these obstacles can result in increased insertion losses and a decreased coupling coefficient at each interface.

For example, conventional optical fiber based optical couplers, such as shown in FIG. 6 (Prior Art) can be configured by inserting standard optical fibers (used as input fibers) into a capillary tube comprised of a material with a refractive index lower than the cladding of the input fibers. However, there are a number of disadvantages to this approach. For example, a fiber cladding-capillary tube interface becomes a light guiding interface of a lower quality than interfaces inside standard optical fibers and, therefore, can be expected to introduce optical loss. Furthermore, the capillary tube must be fabricated using a costly fluorine-doped material, greatly increasing the expense of the coupler.

U.S. Pat. No. 7,308,173, entitled "OPTICAL FIBER COUPLER WITH LOW LOSS AND HIGH COUPLING COEFFICIENT AND METHOD OF FABRICATION THEREOF", which is hereby incorporated herein in its entirety, advantageously addressed issues discussed above by providing various embodiments of an optical fiber coupler capable of providing a low-loss, high-coupling coefficient interface between conventional optical fibers and optical waveguide devices.

Nevertheless, a number of challenges still remained. With the proliferation of optical devices with multiple waveguide interfaces (e.g., waveguide arrays), establishing low-loss high-accuracy connections to arrays of low or high NA waveguides often was problematic, especially because the spacing between the waveguides is very small making coupling thereto all the more difficult. U.S. Pat. No. 8,326,099, entitled "OPTICAL FIBER COUPLER ARRAY", issued Dec. 4, 2012, which is hereby incorporated herein by reference in its entirety, endeavors to address the above challenge by providing, in at least a portion of the embodiments thereof, an optical fiber coupler array that provides a high-coupling coefficient interface with high accuracy and easy alignment between an optical waveguide device having a plurality of closely spaced high NA waveguide interfaces, and a plurality of optical fibers each having low numerical apertures separated by at least a fiber diameter.

U.S. Patent Application Publication No. 2013/0216184, entitled "CONFIGURABLE PITCH REDUCING OPTICAL FIBER ARRAY," which is expressly incorporated by reference herein, teaches a pitch reducing optical fiber array ("PROFA") coupler/interconnect using a vanishing core approach. In at least some of the example implementations thereof, the tip of the PROFA component can be butt-coupled to a photonic integrated circuit ("PIC"), an array of vertical grating couplers ("VGCs"), or delivers the light to free-space optics. Improved coupling to two-dimensional ("2D") polarization maintaining fiber arrays with control of the orientation of the polarization axes can be desirable.

SUMMARY

Example embodiments described herein have innovative features, no single one of which is indispensable or solely responsible for their desirable attributes. Without limiting the scope of the claims, some of the advantageous features will now be summarized.

1. An optical coupler array for optical coupling of a plurality of optical fibers to an optical device, wherein at least one of the plural optical fibers comprises a polarization maintaining optical fiber, comprising:
    an elongated optical element having a first end operable to optically couple with the plural optical fibers and a second end operable to optically couple with said optical device, comprising:
        a common single coupler housing structure;
        a plurality of longitudinal waveguides each positioned at a predetermined spacing from one another, each having a capacity for at least one optical mode of a predetermined mode field profile, each embedded in said common single housing structure, wherein at least one of said plural longitudinal waveguides is a vanishing core waveguide, each said at least one vanishing core waveguide comprising:

an inner vanishing core, having a first refractive index (N-1), and having a first inner core size (ICS-1) at said first end, and a second inner core size (ICS-2) at said second end;

an outer core, longitudinally surrounding said inner core, having a second refractive index (N-2), and having a first outer core size (OCS-1) at said first end, and a second outer core size (OCS-2) at said second end, and an outer cladding, longitudinally surrounding said outer core, having a third refractive index (N-3), a first cladding size at said first end, and a second cladding size at said second end; and wherein said common single coupler housing structure comprises a medium having a fourth refractive index (N-4) surrounding said plural longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium of said common single coupler housing structure, is greater than a total volume of all said vanishing core waveguides inner cores and said outer cores confined within said common single coupler housing structure, and wherein said first inner vanishing core size (ICS-1), said first outer core size (OCS-1), and said predetermined spacing between said plural longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said second inner vanishing core size (ICS-2) is selected to be insufficient to guide light therethrough, and said second outer core size (OCS-2) is selected to be sufficient to guide at least one optical mode, such that:

light traveling from said first end to said second end escapes from said inner vanishing core into said corresponding outer core proximally to said second end, light traveling from said second end to said first end moves from said outer core into said corresponding inner vanishing core proximally to said first end, wherein a linear to circular polarization converter is positioned between the at least one polarization maintaining optical fiber and a corresponding one of said plural longitudinal waveguides, and wherein a quarter wave plate comprising a predefined polarization orientation is positioned between said second end and the optical device, such that light traveling from the at least one polarization maintaining optical fiber to said optical device changes its polarization from linear polarization, oriented in accordance with the orientation of said at least one polarization maintaining optical fiber, first to circular polarization, and then back to linear polarization, oriented in accordance with the orientation of said quarter wave plate.

2. An optical coupler array for optical coupling of a plurality of optical fibers to an optical device, wherein at least one of the plural optical fibers comprises a polarization maintaining optical fiber, comprising:

an optical element having a first end operable to optically couple with the plural optical fibers and a second end operable to optically couple with said optical device; and a plurality of longitudinal waveguides, each positioned at a predetermined spacing from one another, each having a capacity for at least one optical mode of a predetermined mode field profile;

wherein a linear to circular polarization converter is positioned between the at least one polarization maintaining optical fiber and a corresponding one of said plural longitudinal waveguides, and wherein a quarter wave plate comprising a predefined polarization orientation is positioned between said second end and the optical device, such that light traveling from the at least one polarization maintaining optical fiber to said optical device changes its polarization from linear polarization, oriented in accordance with the orientation of said at least one polarization maintaining optical fiber, first to circular polarization, and then back to linear polarization, oriented in accordance with the orientation of said quarter wave plate.

3. An optical coupler array, comprising:

an elongated optical element having a first end and a second end, wherein said first and second ends are operable to optically couple with a plurality of optical fibers, an optical device, or combinations thereof, the optical element further comprising:

a coupler housing structure; and a plurality of longitudinal waveguides arranged with respect to one another, each having a capacity for at least one optical mode, each disposed in said housing structure, wherein said plurality of longitudinal waveguides comprises at least one vanishing core waveguide, said at least one vanishing core waveguide comprising:

an inner vanishing core, having a first refractive index (N-1), and having an inner core size;

an outer core, longitudinally surrounding said inner core, having a second refractive index (N-2), and having an outer core size; and an outer cladding, longitudinally surrounding said outer core, having a third refractive index (N-3), and having a cladding size; and wherein said coupler housing structure comprises a medium having a fourth refractive index (N-4) surrounding said plurality of longitudinal waveguides, wherein N-1>N-2>N-3, wherein said inner core size, said outer core size, and said spacing between said plurality of longitudinal waveguides reduces along said optical element from said first end to said second end such that at said second end, said inner core size is insufficient to guide light therethrough, and said outer core size is sufficient to guide at least one optical mode, wherein a linear to circular polarization converter is positioned between the at least one optical fiber and a corresponding one of said plurality of longitudinal waveguides, and wherein a quarter wave retarder having a polarization orientation is positioned between said optical element and the optical device, such that light traveling from the at least one optical fiber to said optical device changes its polarization from linear polarization, oriented in accordance with the orientation of said at least one optical fiber, first to circular polarization, and then back to linear polarization, oriented in accordance with the orientation of said quarter wave retarder.

4. An optical coupler array for optical coupling of a plurality of optical fibers to an optical device, comprising:
an optical element having a first end operable to optically couple with the plurality of optical fibers and a second end operable to optically couple with said optical device, the optical element comprising:
a plurality of longitudinal waveguides arranged with respect to one another, each having a capacity for at least one optical mode;
wherein a linear to circular polarization converter is positioned between the at least one optical fiber and a corresponding one of said plurality of longitudinal waveguides, and
wherein a quarter wave retarder comprising a polarization orientation is positioned between said second end and the optical device, such that light traveling from the at least one optical fiber to said optical device changes its polarization from linear polarization, oriented in accordance with the orientation of said at least one optical fiber, first to circular polarization, and then back to linear polarization, oriented in accordance with the orientation of said quarter wave retarder.

5. An optical coupler array, comprising:
an optical element having a first end configured to receive light, the optical element further having a second end operable to optically couple with an optical device, the optical element comprising a plurality of longitudinal waveguides;
a linear to circular polarization converter disposed before at least one of the plurality of longitudinal waveguides, the converter configured to receive linearly polarized light and transmit circularly polarized light to the at least one of the plurality of longitudinal waveguides; and
a quarter wave retarder disposed at the second end configured to receive the circularly polarized light from the at least one of the plurality of longitudinal waveguides and transmit linearly polarized light to the optical device.

6. The optical coupler array of claim 5, wherein the quarter wave retarder is attached to the optical element.

7. The optical coupler array of claim 5 or claim 6, wherein the quarter wave retarder is attached to the optical device.

8. The optical coupler array of claim 5, wherein the quarter wave retarder is a free-standing plate.

9. The optical coupler array of any of claims 5-8, wherein the quarter wave retarder comprises a film.

10. The optical coupler array of claim 9, wherein the film is a liquid crystal film.

11. The optical coupler array of any of claims 5-10, wherein the quarter wave retarder has a thickness in the range from 100 nm to 1 mm.

12. The optical coupler array of any of claims 5-11, wherein the transmitted linearly polarized light has polarization axes oriented by the quarter wave retarder.

13. The optical coupler array of claim 12, wherein the transmitted linearly polarized light for different longitudinal waveguides has polarization axes aligned in the same direction by the quarter wave retarder.

14. The optical coupler array of claim 12 or claim 13, wherein orientation of the transmitted linearly polarized light for different longitudinal waveguides is independent of physical orientations of the plurality of longitudinal waveguides.

15. The optical coupler array of any of claims 5-14, wherein the plurality of longitudinal waveguides comprises a plurality of polarization maintaining fibers configured to maintain circularly polarized light.

16. The optical coupler array of any of claims 5-15, wherein the plurality of longitudinal waveguides comprises at least one vanishing core waveguide.

17. The optical coupler array of any of claims 5-16, wherein the plurality of longitudinal waveguides comprises a plurality of vanishing core waveguides.

18. The optical coupler array of any of claims 5-17, wherein the plurality of longitudinal waveguides comprises at least one non-vanishing core waveguide.

19. The optical coupler array of any of claims 5-18, wherein the linear to circular polarization converter comprises:
a twisting region comprising a twist profile, the twisting region having a first region end and a second region end, the first region end disposed proximal, at, or within a portion of a first optical fiber, the second region end disposed proximal, at, or within a section of a second optical fiber.

20. The optical coupler array of claim 19, wherein the first or second optical fiber is spliced to the at least one of the plurality of longitudinal waveguides.

21. The optical coupler array of claim 19 or claim 20, wherein the twist profile comprises a uniform twist.

22. The optical coupler array of claim 19 or claim 20, wherein the twist profile comprises an accelerated twist configured in accordance with a power function.

23. The optical coupler array of any of claims 19-22, wherein the twist profile achieves a maximum extinction ratio.

24. The optical coupler array of any of claims 19-22, wherein the twist profile achieves a minimum extinction ratio.

25. The optical coupler array of any of claims 19-24, wherein the first or second optical fiber comprises a polarization maintaining fiber such as a PANDA fiber.

26. The optical coupler array of any of the preceding claims, wherein the plurality of optical fibers is arranged in a two-dimensional array.

27. The optical coupler array of any of the preceding claims, wherein the optical device comprises a photonic integrated circuit.

28. The optical coupler array of any of the preceding claims, wherein the optical device comprises an array of vertical grating couplers.

29. The optical coupler array of claim 8, wherein the optical device comprises free space optics.

30. A method of controlling polarization orientation between a plurality of optical fibers and an optical device, the method comprising:
providing an optical element comprising a plurality of longitudinal waveguides;
positioning a linear to circular polarization converter between the plurality of optical fibers and at least one of the plurality of longitudinal waveguides of the optical element such that the linear to circular polarization converter is configured to receive linearly polarized light and transmit circularly polarized light to the at least one of the plurality of longitudinal waveguides;
positioning a quarter wave retarder between the optical element and the optical device such that the quarter wave retarder is configured to receive the circularly polarized light from the at least one of the plurality of longitudinal waveguides and transmit linearly polarized light to the optical device.

31. The method of claim 30, further comprising physically attaching the quarter wave retarder to the optical element.

32. The method of claim 30, further comprising fabricating the quarter wave retarder on the optical element.

33. The method of claim 32, wherein fabricating the quarter wave retarder comprises depositing a film on the optical element.

34. The method of claim 30, further comprising physically attaching the quarter wave retarder to the optical device.

35. The method of claim 30, further comprising fabricating the quarter wave retarder on the optical device.

36. The method of claim 35, wherein fabricating the quarter wave retarder comprises depositing a film on the optical device.

37. The method of claim 30, wherein the quarter wave retarder comprises a free-standing plate.

38. The method of any of claims 30-37, comprising orienting the polarization axes of the transmitted linearly polarized light with the quarter wave retarder.

39. The method of claim 38, comprising aligning the polarization axes of the transmitted linearly polarized light in different waveguides in the same direction using the quarter wave retarder.

40. The method of any of claims 30-39, wherein providing the optical element comprises providing a plurality of polarization maintaining fibers configured to maintain circularly polarized light.

41. The method of any of claims 30-40, wherein providing the optical element comprises providing at least one vanishing core waveguide.

42. The method of any of claims 30-41, wherein providing the optical element comprises providing a plurality of vanishing core waveguides.

43. The method of any of claims 30-42, wherein providing the optical element comprises providing at least one non-vanishing core waveguide.

44. The method of any of claims 30-43, comprising connecting a first optical fiber with a second optical fiber.

45. The method of claim 44, further comprising creating a twist profile by twisting a region having a first region end and a second region end, the first region end disposed proximal, at, or within a portion of the first optical fiber, the second region end disposed proximal, at, or within a section of the second optical fiber.

46. The method of claim 45, wherein the first or second optical fiber is spliced to the at least one of the plurality of longitudinal waveguides.

47. The method of claim 46, wherein creating a twist profile comprises uniformly twisting the region.

48. The method of claim 46, wherein creating a twist profile comprises creating an accelerated twist in accordance with a power function.

49. The method of any of claims 46-48, comprising achieving a maximum extinction ratio with the twist profile.

50. The method of any of claims 46-48, comprising achieving a minimum extinction ratio with the twist profile.

51. The method of any of claims 30-50, wherein positioning the linear to circular polarization converter comprises positioning the linear to circular polarization converter between a polarization maintaining fiber, such as a PANDA fiber, and the optical element.

52. The method of any of claims 30-51, wherein positioning the linear to circular polarization converter comprises positioning the linear to circular polarization converter between a two-dimensional array of optical fibers and the optical element.

53. The method of any of claims 30-52, wherein positioning the quarter wave retarder comprises positioning the quarter wave retarder between the optical element and a photonic integrated circuit.

54. The method of any of claims 30-53, wherein positioning the quarter wave retarder comprises positioning the quarter wave retarder between the optical element and an array of vertical grating couplers.

55. The method of claim 37, wherein positioning the quarter wave retarder comprises positioning the quarter wave retarder between the optical element and free space optics.

56. An optical coupler array, comprising:
an optical element having a first end configured to receive light, the optical element further having a second end configured to provide circularly polarized light, the optical element comprising a plurality of longitudinal waveguides;
a linear to circular polarization converter disposed before at least one of the plurality of longitudinal waveguides, the converter configured to receive linearly polarized light and transmit circularly polarized light to the at least one of the plurality of longitudinal waveguides, wherein the at least one of the plurality of longitudinal waveguides is configured to transmit the circularly polarized light at the second end.

57. The optical coupler array of claim 56, wherein the plurality of longitudinal waveguides comprises a plurality of polarization maintaining fibers configured to maintain circularly polarized light.

58. The optical coupler array of any of claims 56-57, wherein the plurality of longitudinal waveguides comprises at least one vanishing core waveguide.

59. The optical coupler array of any of claims 56-58, wherein the plurality of longitudinal waveguides comprises a plurality of vanishing core waveguides.

60. The optical coupler array of any of claims 56-59, wherein the plurality of longitudinal waveguides comprises at least one non-vanishing core waveguide.

61. The optical coupler array of any of claims 56-60, wherein the linear to circular polarization converter comprises:
a twisting region comprising a twist profile, the twisting region having a first region end and a second region end, the first region end disposed proximal, at, or within a portion of a first optical fiber, the second region end disposed proximal, at, or within a section of a second optical fiber.

62. The optical coupler array of claim 61, wherein the first or second optical fiber is spliced to the at least one of the plurality of longitudinal waveguides.

63. The optical coupler array of claim 61 or claim 62, wherein the twist profile comprises a uniform twist.

64. The optical coupler array of claim 61 or claim 62, wherein the twist profile comprises an accelerated twist configured in accordance with a power function.

65. The optical coupler array of any of claims 61-64, wherein the twist profile achieves a maximum extinction ratio.

66. The optical coupler array of any of claims 61-64, wherein the twist profile achieves a minimum extinction ratio.

67. The optical coupler array of any of claims 61-66, wherein the first or second optical fiber comprises a polarization maintaining fiber such as a PANDA fiber.

68. The optical coupler array of any of claims 56-67, wherein the plurality of optical fibers is arranged in a two-dimensional array.

69. An optical coupler array, comprising:
an optical element having a first end configured to receive light, the optical element further having a second end operable to optically couple with an optical device, the optical element comprising a plurality of longitudinal waveguides, wherein at least one of the plurality of longitudinal waveguides is configured to transmit the circularly polarized light at the second end; and
a quarter wave retarder disposed at the second end configured to receive the circularly polarized light from the at least one of the plurality of longitudinal waveguides and transmit linearly polarized light to the optical device.

70. The optical coupler array of claim 69, wherein the quarter wave retarder is attached to the optical element.

71. The optical coupler array of claim 69 or claim 70, wherein the quarter wave retarder is attached to the optical device.

72. The optical coupler array of claim 69, wherein the quarter wave retarder is a free-standing plate.

73. The optical coupler array of any of claims 69-72, wherein the quarter wave retarder comprises a film.

74. The optical coupler array of claim 73, wherein the film is a liquid crystal film.

75. The optical coupler array of any of claims 69-74, wherein the quarter wave retarder has a thickness in the range from 100 nm to 1 mm.

76. The optical coupler array of any of claims 69-75, wherein the transmitted linearly polarized light has polarization axes oriented by the quarter wave retarder.

77. The optical coupler array of claim 76, wherein the transmitted linearly polarized light for different longitudinal waveguides has polarization axes aligned in the same direction by the quarter wave retarder.

78. The optical coupler array of claim 76 or 77, wherein orientation of the transmitted linearly polarized light for different longitudinal waveguides is independent of physical orientations of the plurality of longitudinal waveguides.

79. The optical coupler array of any of claims 69-78, wherein the plurality of longitudinal waveguides comprises a plurality of polarization maintaining fibers configured to maintain circularly polarized light.

80. The optical coupler array of any of claims 69-79, wherein the plurality of longitudinal waveguides comprises at least one vanishing core waveguide.

81. The optical coupler array of any of claims 69-80, wherein the plurality of longitudinal waveguides comprises a plurality of vanishing core waveguides.

82. The optical coupler array of any of claims 69-81, wherein the plurality of longitudinal waveguides comprises at least one non-vanishing core waveguide.

83. The optical coupler array of any of claims 69-82, wherein the plurality of longitudinal waveguides is arranged in a two-dimensional array.

84. The optical coupler array of any of claims 69-83, wherein the optical device comprises a photonic integrated circuit.

85. The optical coupler array of any of claims 69-84, wherein the optical device comprises an array of vertical grating couplers.

86. The optical coupler array of claim 72, wherein the optical device comprises free space optics.

87. The optical coupler array of any of claims 5-29 or any of claims 56-68, further comprising a coupler housing, wherein the linear to circular polarization converter is disposed outside of the coupler housing.

88. The optical coupler array of any of claims 5-29 or any of claims 56-68, further comprising a coupler housing, wherein the linear to circular polarization converter is disposed at least partially within the coupler housing.

89. The optical coupler array of claim 88, wherein the coupler housing comprises a tapered region, and wherein the linear to circular polarization converter is disposed in an untapered region of the coupler housing.

90. The optical coupler array of claim 88 or 89, wherein the linear to circular polarization converter is disposed before any tapering of the plurality of longitudinal waveguides.

91. The optical coupler array of any of claims 88-90, wherein the linear to circular polarization converter comprises optical fibers that are untapered.

BRIEF DESCRIPTION OF THE DRAWINGS

In the drawings, wherein like reference characters denote corresponding or similar elements throughout the various figures:

FIG. 1C is a schematic diagram of a side view of a third example embodiment of an optical fiber coupler array, which comprises a plurality of VC waveguides, and a plurality of Non-VC waveguides, disposed longitudinally and asymmetrically to one another, and where at least a portion of the plural Non-VC waveguides are of different types and/or different characteristics;

FIG. 1D is a schematic diagram of a side view of a fourth example embodiment of an optical fiber coupler array, configured for fan-in and fan-out connectivity and comprising a pair of optical fiber coupler components with a multi-core optical fiber element connected between the second (smaller sized) ends of the two optical fiber coupler components;

FIG. 2A is a schematic diagram of a side view of a fifth example embodiment of an optical fiber coupler array, which comprises a plurality of longitudinally proximal VC waveguides at least partially embedded in a single common housing structure, wherein each plural VC waveguide is spliced, at a particular first splice location, to a corresponding elongated optical device (such as an optical fiber), at least a portion of which extends outside the single common housing structure by a predetermined length, and wherein each particular first splice location is disposed within the single common housing structure;

FIG. 2B is a schematic diagram of a side view of a sixth example embodiment of an optical fiber coupler array, which comprises a plurality of longitudinally proximal VC waveguides at least partially embedded in a single common housing structure, wherein each plural VC waveguide is spliced, at a particular second splice location, to a corresponding elongated optical device (such as an optical fiber), at least a portion of which extends outside the single common housing structure by a predetermined length, and wherein each particular second splice location is disposed at an outer cross-sectional boundary region of the single common housing structure;

FIG. 2C is a schematic diagram of a side view of a seventh example embodiment of an optical fiber coupler array, which comprises a plurality of longitudinally proximal VC waveguides at least partially embedded in a single common housing structure, wherein each plural VC waveguide is spliced, at a particular third splice location, to a corresponding elongated optical device (such as an optical fiber), at least a portion of which extends outside the single common housing structure by a predetermined length, and wherein each particular third splice location is disposed outside the single common housing structure;

FIG. 2D is a schematic diagram of a cross-sectional view of an alternative embodiment of an optical fiber coupler array, comprising a plurality of longitudinally proximal VC waveguides at least partially embedded in a single common housing structure, that is configured at its second end, to increase, improve, and/or optimize optical coupling to a free-space-based optical device;

FIG. 10 is an example method of controlling polarization orientation between a plurality of optical fibers and an optical device.

DETAILED DESCRIPTION

Figure 1A:
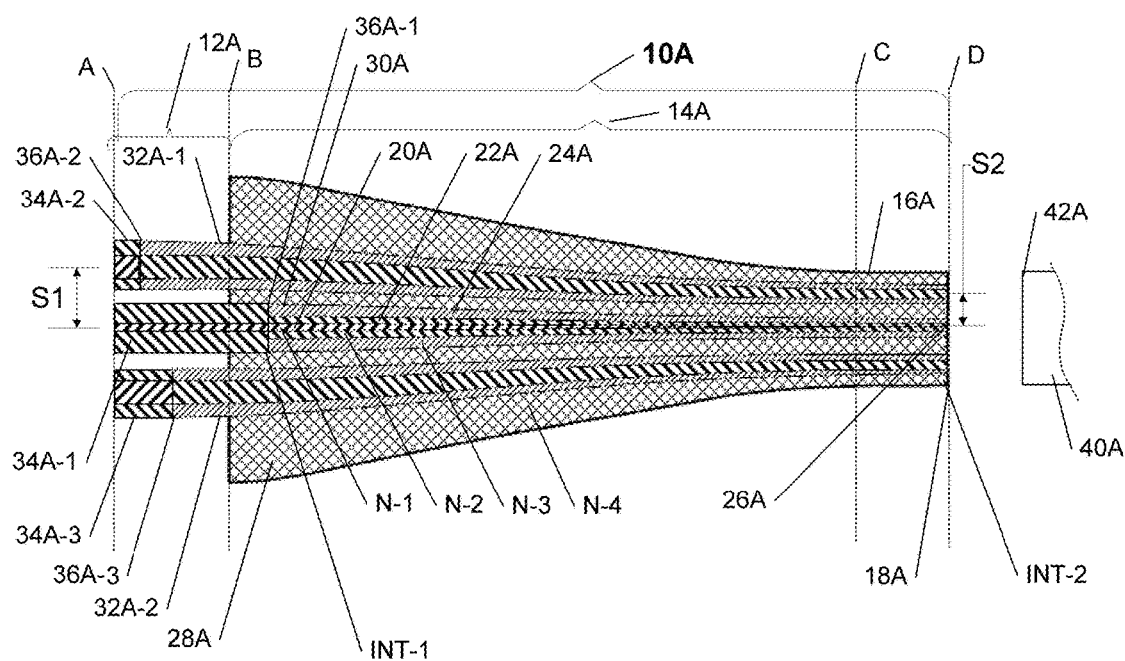
FIG. 1A is a schematic diagram of a side view of a first example embodiment of an optical fiber coupler array, which comprises at least one vanishing core waveguide (VC waveguide), illustrated therein by way of example as a single VC waveguide, and at least one Non-VC waveguide, illustrated therein by way of example as a plurality of Non-VC waveguides, disposed symmetrically proximally to the example single VC waveguide.

Packaging of photonic integrated circuits ("PICs") with a polarization maintaining optical fiber array can be desirable for a variety of applications, including optical communications and sensing. In many of the applications, all polarization axes of light from waveguides (e.g., fibers) in the array may be desired to be aligned in the same direction. While, in some instances, this may be easily achievable for low channel count one dimensional (1D) fiber arrays for edge or face couplers where round polarization maintaining (PM) fibers may be axially aligned in a V-groove array, it may be more difficult task in large port count two dimensional (2D) fiber arrays.

Accordingly, it may be advantageous to provide various embodiments of a PROFA-based flexible optical fiber array component that may be configured to comprise a structure that permits the orientation (alignment in the same direction in many instances) of the polarization axes of individual optical fibers thereof, without the need for adjustment of the orientation of each individual fiber.

Packaging of photonic integrated circuits (PICs) with low vertical profile (perpendicular to the PIC plane) can also be desirable for a variety of applications, including optical communications and sensing. While this is easily achievable for edge couplers, surface couplers may require substantial vertical length.

Accordingly, it may be advantageous to provide various embodiments of a pitch reducing optical fiber array (PROFA)-based flexible optical fiber array component that may be configured and possibly optimized to comprise a structure that maintains all channels discretely with sufficiently low crosstalk, while providing enough flexibility to accommodate low profile packaging. It may further be desirable to provide a PROFA-based flexible optical fiber array component comprising a flexible portion to provide mechanical isolation of a "PROFA-PIC interface" from the rest of the PROFA, resulting in increased stability with respect to environmental fluctuations, including temperature variations and mechanical shock and vibration. It may be additionally desirable to provide a PROFA-based flexible optical fiber array comprising multiple coupling arrays, each having multiple optical channels, combined together to form an optical multi-port input/output (IO) interface.

Certain embodiments are directed to an optical fiber coupler array capable of providing a low-loss, high-coupling coefficient interface with high accuracy and easy alignment between a plurality of optical fibers (or other optical devices) with a first channel-to-channel spacing, and an optical device having a plurality of waveguide interfaces with a second, smaller channel-to-channel spacing. Advantageously, in various embodiments, each of a larger size end and a smaller size end of the optical fiber coupler array is configurable to have a correspondingly different (i.e., larger vs. smaller) channel-to-channel spacing, where the respective channel-to-channel spacing at each of the optical coupler array's larger and smaller ends may be readily matched to a corresponding respective first channel-to-channel spacing of the plural optical fibers at the larger optical coupler array end, and to a second channel-to-channel spacing of the optical device plural waveguide interfaces at the smaller optical coupler array end.

In various embodiments thereof, the optical coupler array includes a plurality of waveguides (at least one of which may optionally be polarization maintaining), that comprises at least one gradually reduced "vanishing core fiber", at least in part embedded within a common housing structure. Alternatively, in various additional embodiments thereof, the coupler array may be configured for utilization with at least one of an optical fiber amplifier and an optical fiber laser.

Each of the various embodiments of the optical coupler array advantageously comprises at least one "vanishing core" (VC) fiber waveguide, described, for example, below in connection with a VC waveguide 30A of the optical coupler array 10A of FIG. 1A.

It should also be noted that the term "optical device" as generally used herein, applies to virtually any single channel or multi-channel optical device, or to any type of optical fiber, including, but not being limited to, standard/conventional optical fibers. For example, optical devices with which the coupler array may advantageously couple may include, but are not limited to, one or more of the following:
- a free-space-based optical device,
- an optical circuit having at least one input/output edge coupling port,
- an optical circuit having at least one optical port comprising vertical coupling elements,
- a multi-mode (MM) optical fiber,
- a double-clad optical fiber,
- a multi-core (MC) optical fiber,
- a large mode area (LMA) fiber,
- a double-clad multi-core optical fiber,
- a standard/conventional optical fiber,
- a custom optical fiber, and/or
- an additional optical coupler array.

In addition, while the term "fusion splice" is utilized in the various descriptions of the example embodiments of the coupler array provided below, in reference to interconnections between various optical coupler array components, and connections between various optical coupler array components and optical device(s), it should be noted, that any other form of waveguide or other coupler array component connectivity technique or methodology may be readily selected and utilized as a matter of design choice or necessity, without departing from the spirit of the invention, including but not limited to mechanical connections.

Referring now to FIG. 1A, a first example embodiment of an optical fiber coupler array is shown as an optical coupler array 10A, which comprises a common housing structure 14A (described below), at least one VC waveguide, shown in FIG. 1A by way of example, as a single VC waveguide 30A, and at least one Non-VC waveguide, shown in FIG. 1A by way of example, as a pair of Non-VC waveguides 32A-1, 32A-2, each positioned symmetrically proximally to one of the sides of the example single VC waveguide 30A, wherein the section of the VC waveguide 30A, located between positions B and D of FIG. 1A is embedded in the common housing structure 14A.

Before describing the coupler array 10A and its components in greater detail, it would be useful to provide a detailed overview of the VC waveguide 30A, the example embodiments and alternative embodiments of which, are advantageously utilized in each of the various embodiments of the coupler arrays of FIGS. 1A to 5.

The VC waveguide 30A has a larger end (proximal to position B shown in FIG. 1A), and a tapered, smaller end (proximal to position C shown in FIG. 1A), and comprises an inner core 20A (comprising a material with an effective refractive index of N-1), an outer core 22A (comprising a material with an effective refractive index of N-2, smaller than N-1), and a cladding 24A (comprising a material with an effective refractive index of N-3, smaller than N-2).

Advantageously, the outer core 22A serves as the effective cladding at the VC waveguide 30A large end at which the VC waveguide 30A supports "M1" spatial propagating modes within the inner core 20A, where M1 is larger than 0. The indices of refraction N-1 and N-2, are preferably chosen so that the numerical aperture (NA) at the VC waveguide 30A large end matches the NA of an optical device (e.g. an optical fiber) to which it is connected (such as an optical device 34A-1, for example, comprising a standard/conventional optical fiber connected to the VC waveguide 30A at a connection position 36A-1 (e.g., by a fusion splice, a mechanical connection, or by other fiber connection designs), while the dimensions of the inner and outer cores (20A, 22A), are preferably chosen so that the connected optical device (e.g., the optical device 34A-1), has substantially the same mode field dimensions (MFD). Here and below we use mode field dimensions instead of commonly used mode field diameter (also MFD) due to the case that the cross section of the VC or Non-VC waveguides may not be circular, resulting in a non-circular mode profile. Thus, the mode field dimensions include both the mode size and the mode shape and equal to the mode field diameter in the case of a circularly symmetrical mode.

During fabrication of the coupler array 10A from an appropriately configured preform (comprising the VC waveguide 30A preform having the corresponding inner and outer cores 20A, 22A, and cladding 24A), as the coupler array 10A preform is tapered in accordance with at least one predetermined reduction profile, the inner core 20A becomes too small to support all M1 modes. The number of spatial modes, supported by the inner core at the second (tapered) end is M2, where M2<M1. In the case of a single mode waveguide, where M1=1 (corresponding to 2 polarization modes), M2=0, meaning that inner core is too small to support light propagation. The VC waveguide 30A then acts as if comprised a fiber with a single core of an effective refractive index close to N-2, surrounded by a cladding of lower index N-3.

During fabrication of the coupler array 10A, a channel-to-channel spacing S-1 at the coupler array 10A larger end (at position B, FIG. 1A), decreases in value to a channel-to-channel spacing S-2 at the coupler array 10A smaller end (at position C, FIG. 1A), in proportion to a draw ratio selected for fabrication, while the MFD value (or the inversed NA value of the VC waveguide 30A) can be either reduced, increased or preserved depending on a selected differences in refractive indices, (N-1−N-2) and (N-2−N-3), which depends upon the desired application for the optical coupler array 10A, as described below.

The capability of independently controlling the channel-to-channel spacing and the MFD values at each end of the optical coupler array is a highly advantageous feature of certain embodiments. Additionally, the capability to match MFD and NA values through a corresponding selection of the sizes and shapes of inner 20A and outer 22A cores and values of N-1, N-2, and N-3, makes it possible to utilize the optical coupler array to couple to various waveguides without the need to use a lens.

In various embodiments thereof, the property of the VC waveguide permitting light to continue to propagate through the waveguide core along the length thereof when its diameter is significantly reduced, advantageously, reduces optical loss from interfacial imperfection or contamination, and allows the use of a wide range of materials for a medium 28A of the common housing structure 14A (described below), including, but not limited to:
(a) non-optical materials (since the light is concentrated inside the waveguide core),
(b) absorbing or scattering materials or materials with refractive index larger than the refractive index of standard/conventional fibers for reducing or increasing the crosstalk between the channels, and
(c) pure-silica (e.g., the same material as is used in most standard/conventional fiber claddings, to facilitate splicing to multi-core, double-clad, or multi-mode fiber.

Preferably, in accordance with certain embodiments, the desired relative values of NA-1 and NA-2 (each at a corresponding end of the coupler array 10A, for example, NA-1 corresponding to the coupler array 10A large end, and NA-2 corresponding to the coupler array 10A small end), and, optionally, the desired value of each of NA-1 and NA-2), may be determined by selecting the values of the refractive indices N1, N2, and N3 of the coupler array 10A, and configuring them in accordance with at least one of the following relationships, selected based on the desired relative numerical aperture magnitudes at each end of the coupler array 10A:

| Desired NA-1/NA-2 Relative Magnitude | Corresponding Relationship bet. N1, N2, N3 |
| --- | --- |
| NA-1 (lrg. end) > NA-2 (sm. end) | (N1 − N2 > N2 − N3) |
| NA-1 (lrg. end) = NA-2 (sm. end) | (N1 − N2 = N2 − N3) |
| NA-1 (lrg. end) < NA-2 (sm. end) | (N1 − N2 < N2 − N3) |

Commonly the NA of any type of fiber is determined by the following expression:

$$NA = \sqrt{n_{core}^2 - n_{clad}^2},$$

where $n_{core}$ and $n_{clad}$ are the refractive indices of fiber core and cladding respectively.

It should be noted that when the above expression is used, the connection between the NA and the acceptance angle of the fiber is only an approximation. In particular, fiber manufacturers often quote "NA" for single-mode (SM) fibers based on the above expression, even though the acceptance angle for a single-mode fiber is quite different and cannot be determined from the indices of refraction alone.

In accordance with certain embodiments, as used herein, the various NA values are preferably determined utilizing effective indices of refraction for both $n_{core}$ and $n_{cladding}$, because the effective indices determine the light propagation and are more meaningful in the case of structured waveguides utilized in various embodiments. Also, a transverse refractive index profile inside a waveguide may not be flat, but rather varying around the value N1, N2, N3, or N4. In addition, the transition between regions having refractive indices N1, N2, N3, and N4 may not be as sharp as a step function due to dopant diffusion or some other intentional or non-intentional factors, and may be a smooth function, connecting the values of N1, N2, N3, and N4. Coupling design or optimization may involve changing both the values of N1, N2, N3, and N4 and the sizes and shapes of the regions having respective indices.

Returning now to FIG. 1A, the common coupling structure 14A, comprises the medium 28A, in which the section of the VC waveguide 30A located between positions B and D of FIG. 1A is embedded, and which may include, but is not limited to, at least one of the following materials:

a material, having properties prohibiting propagation of light therethrough,
a material having light-absorbing optical properties,
a material having light scattering optical properties,
a material having optical properties selected such that said fourth refractive index (N-4) is greater than said third refractive index (N-3), and/or
a material having optical properties selected such that said fourth refractive index (N-4) is substantially equal to said third refractive index (N-3).

At the optical coupler array 10A large end (proximally to position B in FIG. 1A), the VC waveguide 30A is spliced, at a particular splice location 36A-1 (shown by way of example as positioned inside the common housing structure 14A), to a corresponding respective elongated optical device 34A-1 (for example, such as an optical fiber), at least a portion of which extends outside the common housing structure 14A by a predetermined length 12A, while the Non-VC waveguides 32A-1, 32A-2 are spliced, at particular splice locations 36A-2, 36A-3, respectively (disposed outside of the common housing structure 14A), to corresponding respective elongated optical devices 34A-2, 34A-3 (such as optical fibers), and extending outside the common housing structure 14A by a predetermined length 12A.

Optionally, the coupler array 10A may also include a substantially uniform diameter tip 16A (shown between positions C and D in FIG. 1A) for coupling, at an array interface 18A with the interface 42A of an optical waveguide device 40A. The uniform diameter tip 16A may be useful in certain interface applications, such as for example shown in FIGS. 1D, 4 and 5. Alternatively, the coupler array 10A may be fabricated without the tip 16A (or have the tip 16A removed after fabrication), such that coupling with the optical device interface 42A, occurs at a coupler array 10A interface at position C of FIG. 1A.

In an alternative embodiment, if the optical device 40A comprises a double-clad fiber, when the small end of the coupler array 10A is coupled (for example, fusion spliced) to the optical device interface 42A, at least a portion of the common housing structure 14A proximal to the splice position (such as at least a portion of the tip 16A), may be coated with a low index medium (not shown), extending over the splice position and up to the double-clad fiber optical device 40A outer cladding (and optionally extending over a portion of the double-clad fiber optical device 40A outer cladding that is proximal to the splice position).

Figure 1B:
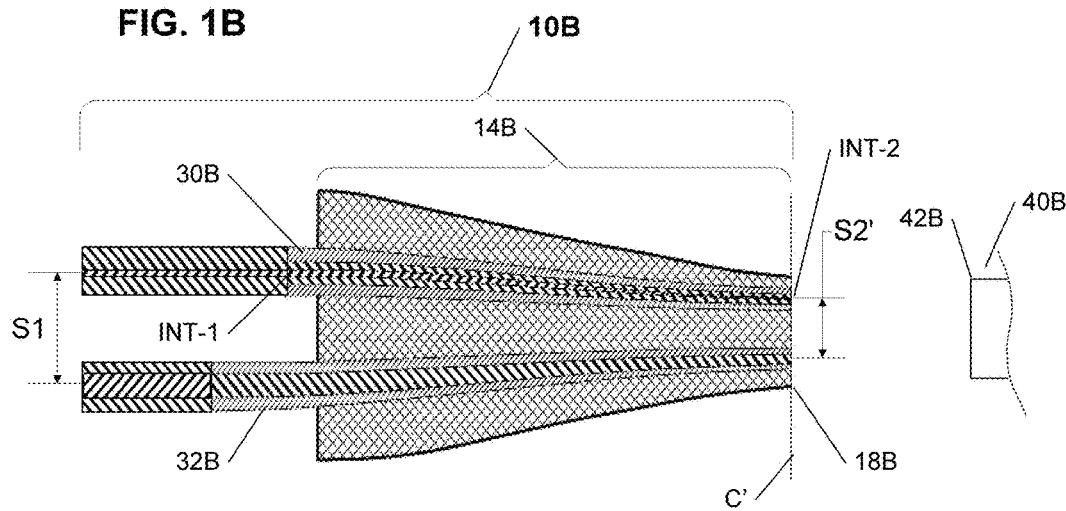
FIG. 1B is a schematic diagram of a side view of a second example embodiment of an optical fiber coupler array, which comprises at least one vanishing core waveguide (VC waveguide), illustrated therein by way of example as a single VC waveguide, and at least one Non-VC waveguide, illustrated therein by way of example as a single Non-VC waveguide, disposed in parallel proximity to the example single VC waveguide, where a portion of the optical fiber coupler array has been configured to comprise a higher channel-to-channel spacing magnitude at its second (smaller) end than the corresponding channel-to-channel spacing magnitude at the second end of the optical fiber coupler array of FIG. 1A.

Referring now to FIG. 1B, a second example embodiment of the optical fiber coupler array, is shown as a coupler array 10B. The coupler array 10B comprises a common housing structure 14B, at least one VC waveguide, shown in FIG. 1B by way of example, as a single VC waveguide 30B, and at least one Non-VC waveguide, shown in FIG. 1B by way of example, as a single Non-VC waveguide 32B, disposed in parallel proximity to the VC waveguide 30B, where a portion of the optical coupler array 10B, has been configured to comprise a larger channel-to-channel spacing value S2' at its small end, than the corresponding channel-to-channel spacing value S2 at the small end of the optical coupler array 10A, of FIG. 1A. This configuration may be readily implemented by transversely cutting the optical fiber array 10A at a position C', thus producing the common housing structure 14B that is shorter than the common housing structure 14A and resulting in a new, larger diameter array interface 18B, having the larger channel-to-channel spacing value S2'.

Referring now to FIG. 1C, a third example embodiment of the optical fiber coupler array, is shown as a coupler array 10C. The coupler array 10C comprises a plurality of VC waveguides, shown in FIG. 1C as VC waveguides 30C-1, and 30C-2, and a plurality of Non-VC waveguides, shown in FIG. 1C as Non-VC waveguides 32C-1, 32C-2, and 32C-a, all disposed longitudinally and asymmetrically to one another, wherein at least a portion of the plural Non-VC waveguides are of different types and/or different characteristics (such as single mode or multimode or polarization maintaining etc.)—for example, Non-VC waveguides 32C-1, 32C-2 are of a different type, or comprise different characteristics from the Non-VC waveguide 32C-a. Additionally, any of the VC or Non-VC waveguides (such as, for example, the Non-VC waveguide 32C-a) can readily extend beyond the coupler array 10C common housing structure by any desired length, and need to be spliced to an optical device proximally thereto.

Referring now to FIG. 1D, a fourth example embodiment of the optical fiber coupler array that is configured for multi-core fan-in and fan-out connectivity, and shown as a coupler array 50. The coupler array 50 comprises a pair of optical fiber coupler array components (10D-1 and 10D-2), with a multi-core optical fiber element 52 connected (e.g., by fusion splicing at positions 54-1 and 54-2) between the second (smaller sized) ends of the two optical fiber coupler array components (10D-1, 10D-2). Preferably, at least one of the VC waveguides in each of the coupler array components (10D-1, 10D-2) is configured to increase or maximize optical coupling to a corresponding selected core of the multi-core optical fiber element 52, while decreasing or minimizing optical coupling to all other cores thereof.

Referring now to FIG. 2A, a fifth example embodiment of the optical fiber coupler array, is shown as a coupler array 100A. The coupler array 100A comprises a plurality of longitudinally proximal VC waveguides at least partially embedded in a single common housing structure 104A, shown by way of example only, as plural VC waveguides 130A-1, 130A-2. Each plural VC waveguide 130A-1, 130A-2 is spliced, at a particular splice location 132A-1, 132A-2, respectively, to a corresponding respective elongated optical device 134A-1, 134A-2 (such as an optical fiber), at least a portion of which extends outside the common housing structure 104A by a predetermined length 102A, and wherein each particular splice location 132A-1, 132A-2 is disposed within the common housing structure 104A.

Referring now to FIG. 2B, a sixth example embodiment of the optical fiber coupler array, is shown as a coupler array 100B.

The coupler array 100B comprises a plurality of longitudinally proximal VC waveguides at least partially embedded in a single common housing structure 104B, shown by way of example only, as plural VC waveguides 130B-1, 130B-2. Each plural VC waveguide 130B-1, 130B-2 is spliced, at a particular splice location 132B-1, 132B-2, respectively, to a corresponding respective elongated optical device 134B-1, 134B-2 (such as an optical fiber), at least a portion of which extends outside the common housing structure 104B by a predetermined length 102B, and wherein each particular splice location 132B-1, 132B-2 is disposed at an outer cross-sectional boundary region of the common housing structure 104B.

Referring now to FIG. 2C, a seventh example embodiment of the optical fiber coupler array, is shown as a coupler array 100C.

The coupler array 100C comprises a plurality of longitudinally proximal VC waveguides at least partially embedded in a single common housing structure 104C, shown by way of example only, as plural VC waveguides 130C-1, 130C-2. Each plural VC waveguide 130C-1, 130C-2 is spliced, at a particular splice location 132C-1, 132C-2, respectively, to a corresponding respective elongated optical device 134C-1, 134C-2 (such as an optical fiber), at least a portion of which extends outside the common housing structure 104C by a predetermined length 102C, and wherein each particular splice location 132C-1, 132C-2 is disposed outside of the common housing structure 104C.

Referring now to FIG. 2D, an alternative embodiment of the optical fiber coupler array, is shown as a coupler array 150. The coupler array 150 comprises a plurality of longitudinally proximal VC waveguides at least partially embedded in a single common housing structure, that is configured at its second end, to increase or optimize optical coupling to a free-space-based optical device 152. The free-space-based optical device 152 may comprise a lens 154 followed by an additional optical device component 156, which may comprise, by way of example, a MEMS mirror or volume Bragg grating. The combination of the coupler and the free-space-based optical device 152 may be used as an optical switch or WDM device for spectral combining or splitting of light signals 160b (representative of the light coupler array 150 output light signals 160a after they have passed through the lens 154.) In this case, one of the fibers may be used as an input and all others for an output or vice versa.

Prior to describing the various embodiments shown in FIGS. 3A to 3L in greater detail, it should be understood that whenever a "plurality" or "at least one" coupler component/element is indicated below, the specific quantity of such coupler components/elements that may be provided in the corresponding embodiment of the coupler array, may be selected as a matter of necessity, or design choice (for example, based on the intended industrial application of the coupler array), without departing from the spirit of the present invention. Accordingly, in the various FIGS. 3A to 3L, single or individual coupler array components/elements are identified by a single reference number, while each plurality of the coupler component/elements is identified by a reference number followed by a "(1 . . . n)" designation, with "n" being a desired number of plural coupler elements/components (and which may have a different value in any particular coupler array embodiment described below).

Also, all the waveguides VC and Non-VC are shown with a circular cross-section of the inner and outer core and cladding only by example. Other shapes of the cross-sections of the inner and outer core and cladding (for example, hexagonal, rectangular or squared) may be utilized without departure from the current invention. The specific choice of shape is based on various requirements, such as channel shape of the optical device, channel positional geometry (for example, hexagonal, rectangular or square lattice), or axial polarization alignment mode.

Similarly, unless otherwise indicated below, as long as various relationships set forth below (for example, the relative volume relationship set forth below with respect to optical coupler arrays 200C and 200D of FIGS. 3C and 3D, respectively, and the feature, set forth below in connection with the coupler array 200H of FIG. 3H, that the PM VC waveguide 204H is positioned longitudinally off-centered transversely from the coupler array 200H central longitudinal axis), are adhered to, the sizes, relative sizes, relative positions and choices of composition materials, are not limited to the example sizes, relative sizes, relative positions and choices of composition materials, indicated below in connection with the detailed descriptions of the coupler array embodiments of FIGS. 3A to 3L, but rather they may be selected by one skilled in the art as a matter of convenience or design choice, without departing from the spirit of the present invention.

Finally, it should be noted that each of the various single common housing structure components 202A to 202L, of the various coupler arrays 200A to 200L of FIGS. 3A to 3L, respectively, may be composed of a medium having the refractive index N-4 value in accordance with an applicable one of the above-described relationships with the values of other coupler array component refractive indices N-1, N-2, and N-3, and having properties and characteristics selected from the various contemplated example medium composition parameters described above in connection with medium 28A of FIG. 1A.

Figure 3A:
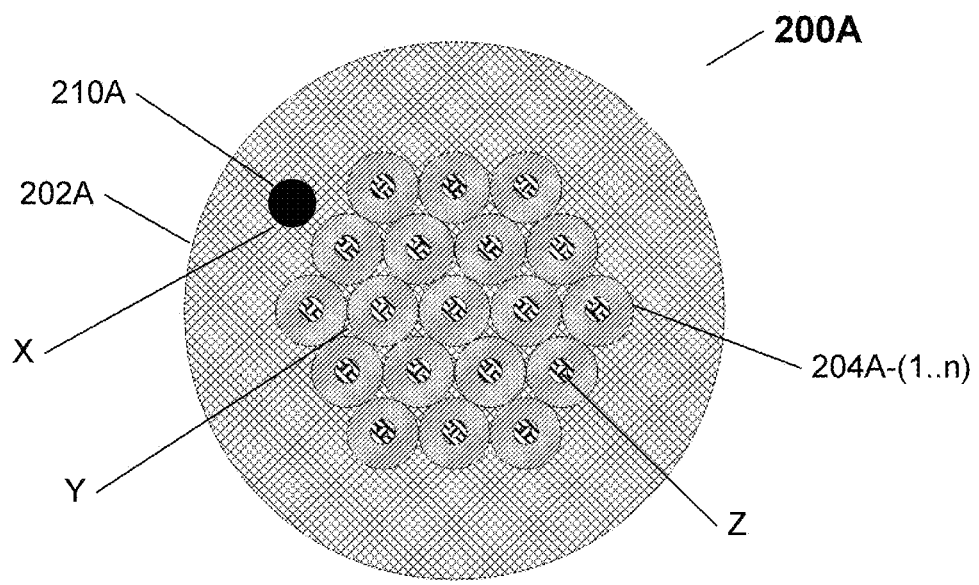
FIG. 3A is a schematic diagram of a cross-sectional view of a first alternative embodiment of the optical fiber coupler arrays of FIGS. 1D to 2D, above, and optionally comprising a fiducial element operable to provide a visual identification of waveguide arrangement/characteristics (such as alignment), which may be disposed in one of several categories of cross-sectional regions.

Referring now to FIG. 3A, a first alternative embodiment of the optical fiber coupler array embodiments of FIGS. 1D to 2D, is shown as a coupler array 200A in which all waveguides are VC waveguides. The coupler array 200A comprises a single common housing 202A, and plurality of VC waveguides 204A-(1 . . . n), with n being equal to 19 by way of example only, disposed centrally along the central longitudinal axis of the housing 202A. The coupler array 200A may also comprise an optional at least one fiducial element 210A, operable to provide one or more useful properties to the coupler array, including, but not limited to:

enabling visual identification (at at least one of the coupler array's ends) of the coupler array waveguide arrangement; and facilitating passive alignment of at least one of the coupler array ends to at least one optical device.

Furthermore, when deployed in optical coupler array embodiments that comprise at least one polarization maintaining VC waveguide (such as the optical coupler array embodiments described below in connection with FIGS. 3H-3L), a fiducial element is further operable to:

enable visual identification of the optical coupler array's particular polarization axes alignment mode (such as described below in connection with FIGS. 3H-3L); and serve as a geometrically positioned reference point for alignment thereto, of one or more polarization axis of PM waveguides in a particular optical coupler array.

The fiducial element 210A may comprise any of the various types of fiducial elements known in the art, selected as a matter of design choice or convenience without departing from the spirit of the invention—for example, it may be a dedicated elongated element positioned longitudinally within the common housing structure 202A in one of various cross-sectional positions (such as positions X or Y, shown in FIG. 3A. Alternatively, the fiducial element 210A may comprise a dedicated channel not used for non-fiducial purposes, for example, replacing one of the waveguides 204A-(1 . . . n), shown by way of example only at position Z in FIG. 3A.

Figure 3B:
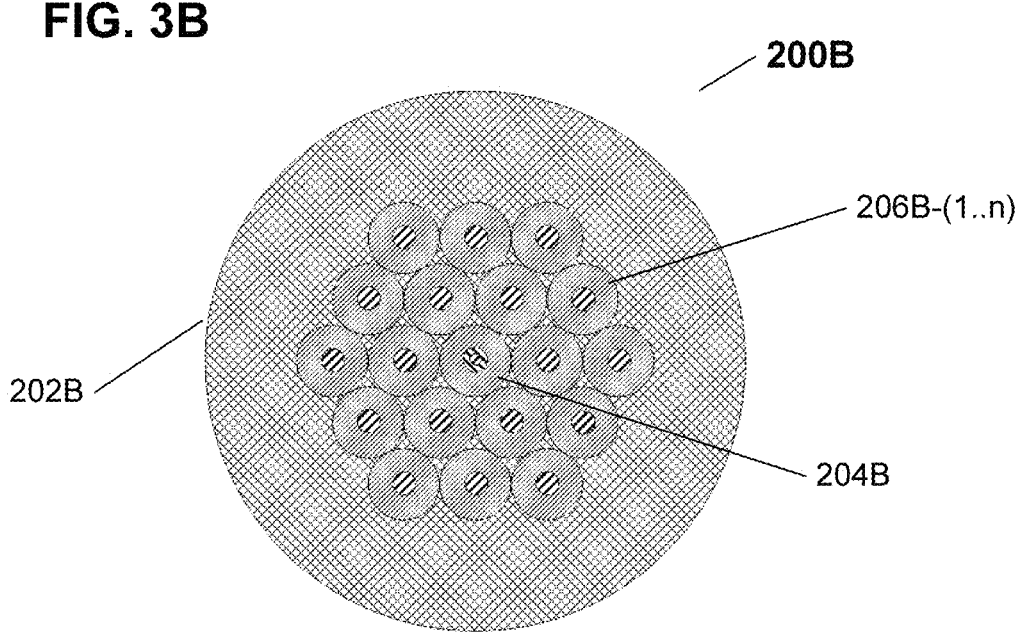
FIG. 3B is a schematic diagram of a cross-sectional view of a first alternative embodiment of the optical fiber coupler array of FIG. 1A, above, in which at least one VC waveguide, illustrated therein by way of example as a single VC waveguide, is positioned along a central longitudinal axis of the single common housing structure, and surrounded by a plurality of parallel proximal symmetrically positioned Non-VC waveguides.

Referring now to FIG. 3B, a first alternative embodiment of the optical fiber coupler array 10A of FIG. 1A, above, is shown as a coupler array 200B, that comprises a single housing structure 202B, and at least one VC waveguide, shown in FIG. 3B by way of example as a VC waveguide 204B, and a plurality of Non-VC waveguides 206B-(1 . . . n), with n being equal to 18 by way of example only. The VC waveguide 204B is positioned along a central longitudinal axis of the common housing structure 202B, and circumferentially and symmetrically surrounded by proximal parallel plural Non-VC waveguides 206B-(1 . . . n).

Figure 3C:
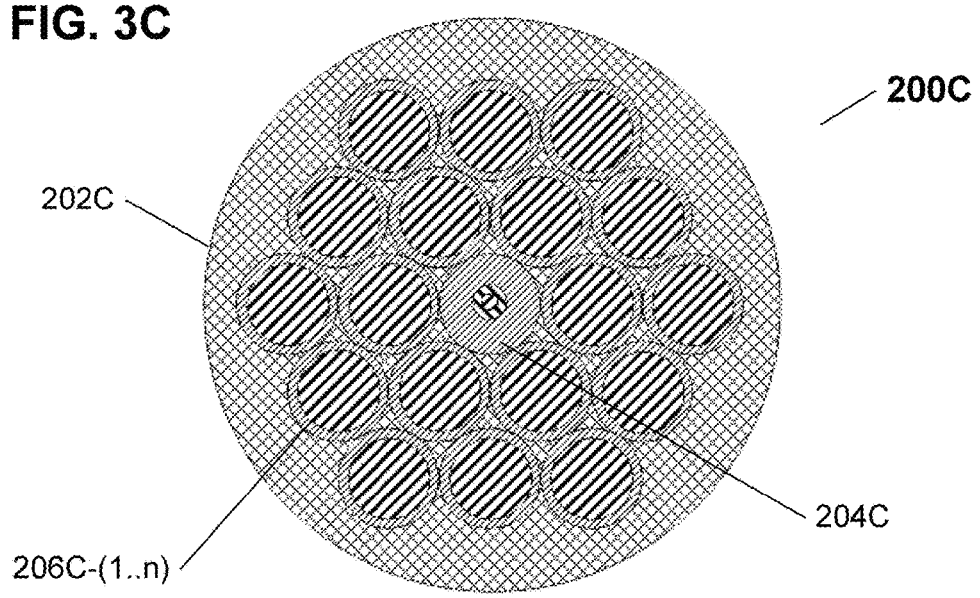
FIG. 3C is a schematic diagram of a cross-sectional view of a first alternative embodiment of the optical fiber coupler array of FIG. 3B above, in which a volume of the single common housing structure medium surrounding the sections of all of the waveguides embedded therein, exceeds a total volume of the inner and outer cores of the section of the VC waveguide that is embedded within the single common housing structure.

Referring now to FIG. 3C, a first alternative embodiment of the optical fiber coupler array 200B of FIG. 3B, above, is shown as a coupler array 200C that comprises a single housing structure 202C, a VC waveguide 204C, and a plurality of Non-VC waveguides 206C-(1 . . . n), with n being equal to 18 by way of example only. The VC waveguide 204C is positioned along a central longitudinal axis of the common housing structure 202C, and circumferentially and symmetrically surrounded by proximal parallel plural Non-VC waveguides 206C-(1 . . . n). The coupler array 200C is configured such that a volume of the common housing structure 202C medium, surrounding the sections of all of the waveguides embedded therein (i.e., the VC waveguide 204C and the plural Non-VC waveguides 206C-(1 . . . n)), exceeds a total volume of the inner and outer cores of the section of the VC waveguide 204C that is embedded within the single common housing structure 202C.

Figure 3D:
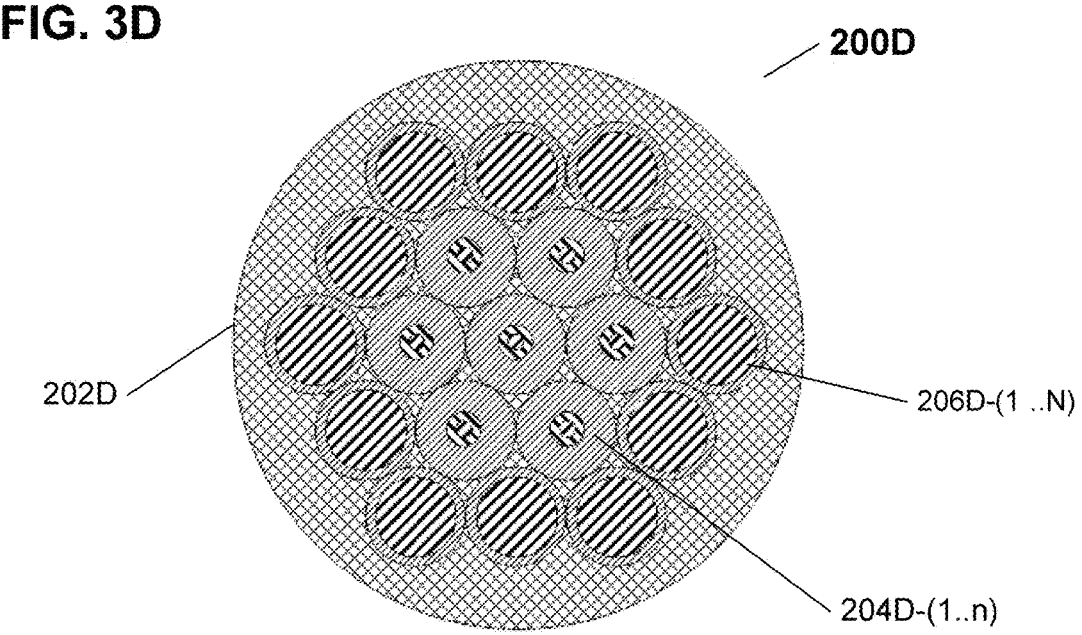
FIG. 3D is a schematic diagram of a cross-sectional view of a second alternative embodiment of the optical fiber coupler array of FIG. 3B above, in which the at least one VC waveguide positioned along the central longitudinal axis of the single common housing structure comprises a plurality of VC waveguides, and wherein a volume of the single common housing structure medium surrounding the sections of all of the waveguides embedded therein, exceeds a total volume of the inner and outer cores of the sections of the plural VC waveguides that are embedded within the single common housing structure.

Referring now to FIG. 3D, a first alternative embodiment of the optical fiber coupler array 200C of FIG. 3C, above, is shown as a coupler array 200D that comprises a single housing structure 202D, a plurality of VC waveguides 204D-(1 . . . N), with N being equal to 7 by way of example only, and a plurality of Non-VC waveguides 206D-(1 . . . n), with n being equal to 12 by way of example only. The plural VC waveguides 204D-(1 . . . N) are positioned along a central longitudinal axis of the common housing structure 202D, and circumferentially and symmetrically surrounded by proximal parallel plural Non-VC waveguides 206D-(1 . . . n). The coupler array 200D is configured such that a volume of the common housing structure 202D medium, surrounding the sections of all of the waveguides embedded therein (e.g., the plural VC waveguides 204D-(1 . . . N), and the plural Non-VC waveguides 206D-(1 . . . n)), exceeds a total volume of the inner and outer cores of the section of the plural VC waveguides 204D-(1 . . . N) that are embedded within the single common housing structure 202D.

Figure 3E:
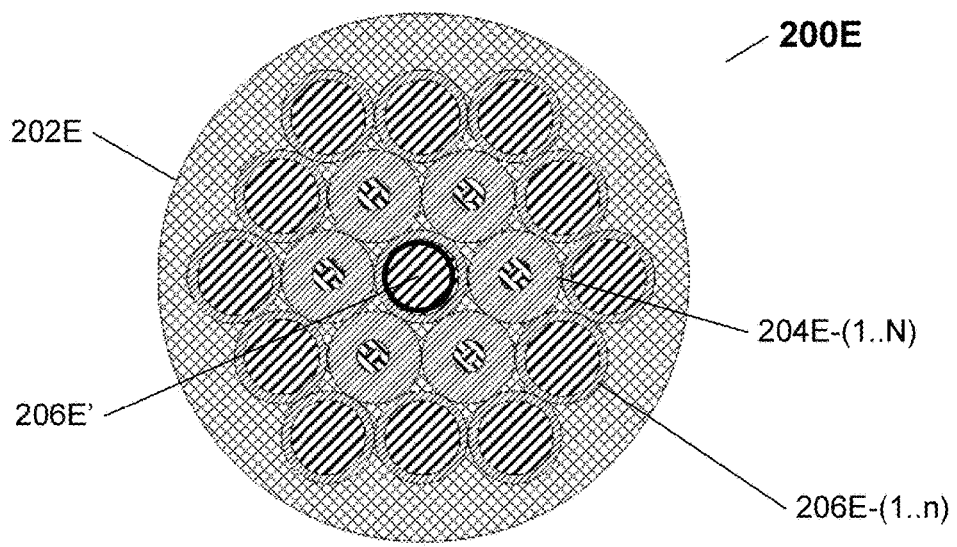
FIG. 3E is a schematic diagram of a cross-sectional view of a first alternative embodiment of the optical fiber coupler array of FIG. 3D, further comprising a central waveguide channel operable to provide optical pumping functionality therethrough.

Referring now to FIG. 3E, a first alternative embodiment of the optical fiber coupler array 200D of FIG. 3D, above, is shown as a coupler array 200E, that comprises a single housing structure 202E, a plurality of VC waveguides 204E-(1 . . . N), with N being equal to 6 by way of example only, a plurality of Non-VC waveguides 206E-(1 . . . n), with n being equal to 12 by way of example only, and a separate single Non-VC waveguide 206E'. The Non-VC waveguide 206E', is preferably operable to provide optical pumping functionality therethrough, and is positioned along a central longitudinal axis of the common housing structure 202E and circumferentially and symmetrically surrounded by proximal parallel plural VC waveguides 204E-(1 . . . N), that are in turn circumferentially and symmetrically surrounded by proximal parallel plural Non-VC waveguides 206E-(1 . . . n).

Figure 3F:
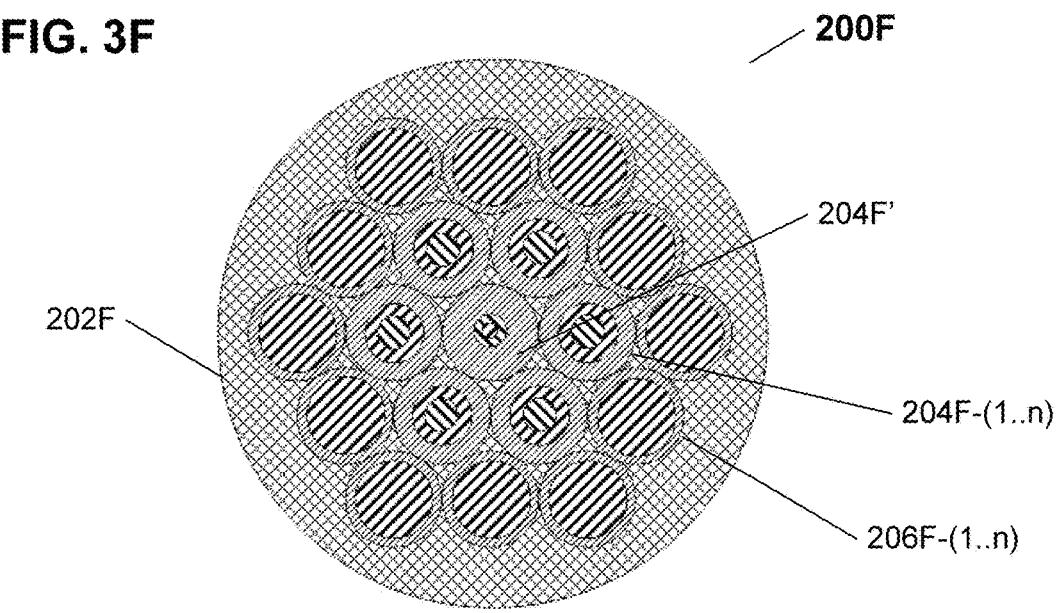
FIG. 3F is a schematic diagram of a cross-sectional view of a second alternative embodiment of the optical fiber coupler array of FIG. 3D, in which the VC waveguide that is positioned along the central longitudinal axis of the single common housing structure, is of a different type, and/or comprises different characteristics from the remaining plural VC waveguides, which, if selected to comprise enlarged inner cores, may be advantageously utilized for increasing or optimizing optical coupling to different types of optical pump channels of various optical devices.

Referring now to FIG. 3F, a second alternative embodiment of the optical fiber coupler array 200B of FIG. 3B, above, is shown as a coupler array 200F, that comprises a single housing structure 202F, a plurality of VC waveguides 204F-(1 . . . N), with N being equal to 6 by way of example only, a separate single VC waveguide 204F', and a plurality of Non-VC waveguides 206F-(1 . . . n), with n being equal to 12 by way of example only, that preferably each comprise enlarged inner cores of sufficient diameter to increase or optimize optical coupling to different types of optical pump channels of various optical devices, to which the coupler array 200F may be advantageously coupled. The VC waveguide 204F', is positioned along a central longitudinal axis of the common housing structure 202F, and circumferentially and symmetrically surrounded by proximal parallel plural VC waveguides 204F-(1 . . . N), that are in turn circumferentially and symmetrically surrounded by proximal parallel plural Non-VC waveguides 206F-(1 . . . n).

Figure 3G:
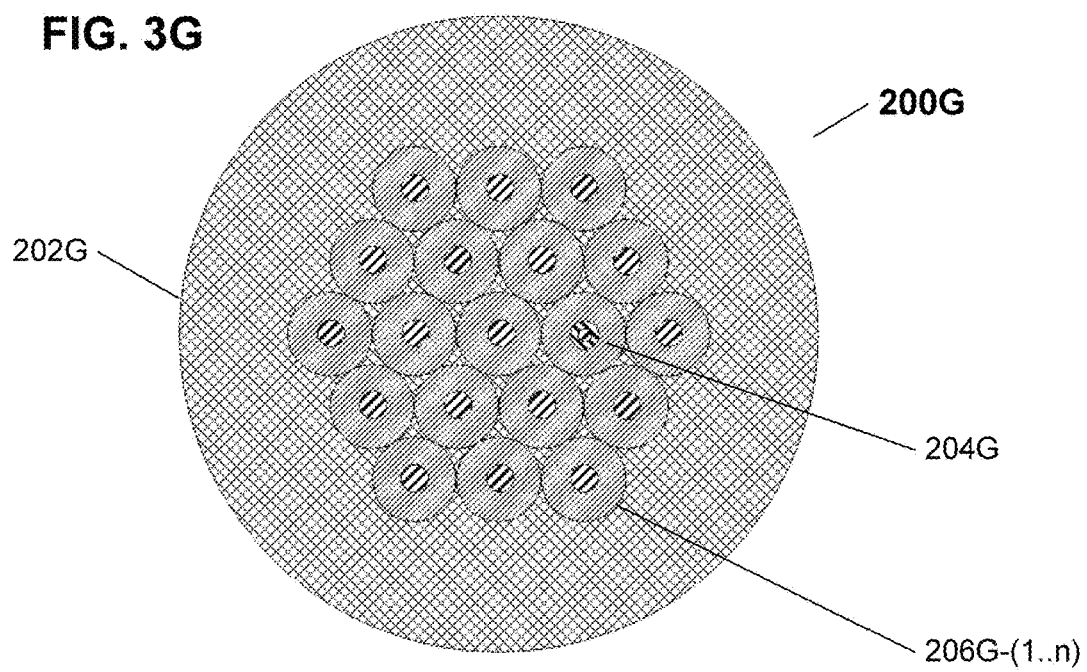
FIG. 3G is a schematic diagram of a cross-sectional view of a third alternative embodiment of the optical fiber coupler array of FIG. 3B above, in which at least one VC waveguide, illustrated therein by way of example as a single VC waveguide, is positioned as a side-channel, off-set from the central longitudinal axis of the single common housing structure, such that this embodiment of the optical fiber coupler array may be readily used as a fiber optical amplifier and or a laser, when spliced to a double-clad optical fiber having a non-concentric core for improved optical pumping efficiency.

Referring now to FIG. 3G, a third alternative embodiment of the optical fiber coupler array 200B of FIG. 3B, above, is shown as a coupler array 200G, that comprises a single housing structure 202G, and at least one VC waveguide, shown in FIG. 3G by way of example as a VC waveguide 204G, and a plurality of Non-VC waveguides 206G-(1 . . . n), with n being equal to 18 by way of example only. The VC waveguide 204G is positioned as a side-channel, off-set from the central longitudinal axis of the single common housing structure 202G, such that optical fiber coupler array 200G may be readily used as a fiber optical amplifier and or a laser, when spliced to a double-clad optical fiber (not shown) having a non-concentric core for improved optical pumping efficiency. It should be noted that because a double-clad fiber is a fiber in which both the core and the inner cladding have light guiding properties, most optical fiber types, such as SM, MM, LMA, or MC (multi-core), whether polarization maintaining or not, and even standard (e.g., conventional) single mode optical fibers, can be converted into a double-clad fiber by coating (or recoating) the fiber with a low index medium (forming the outer cladding).

Optionally, when the second end of the coupler array 200G is spliced to a double-clad fiber (not shown), at least a portion of the common housing structure 202G proximal to the splice point with the double-clad fiber (not-shown), may be coated with a low index medium extending over the splice point and up to the double-clad fiber's outer cladding (and optionally extending over a portion of the outer cladding that is proximal to the splice point).

Referring now to FIGS. 3H to 3L, in various alternative example embodiments of the optical coupler, at least one of the VC waveguides utilized therein, and, in certain embodiments, optionally at least one of the Non-VC waveguides, may comprise a polarization maintaining (PM) property. By way of example, the PM property of a VC waveguide may result from a pair of longitudinal stress rods disposed within the VC waveguide outside of its inner core and either inside, or outside, of the outer core (or through other stress elements), or the PM property may result from a noncircular inner or outer core shape, or from other PM-inducing optical fiber configurations (such as in bow-tie or elliptically clad PM fibers). In various embodiments of the optical fiber in which at least one PM waveguide (VC and/or Non-VC) is utilized, an axial alignment of the PM waveguides (or waveguide), in accordance with a particular polarization axes alignment mode may be involved.

Figure 3H:
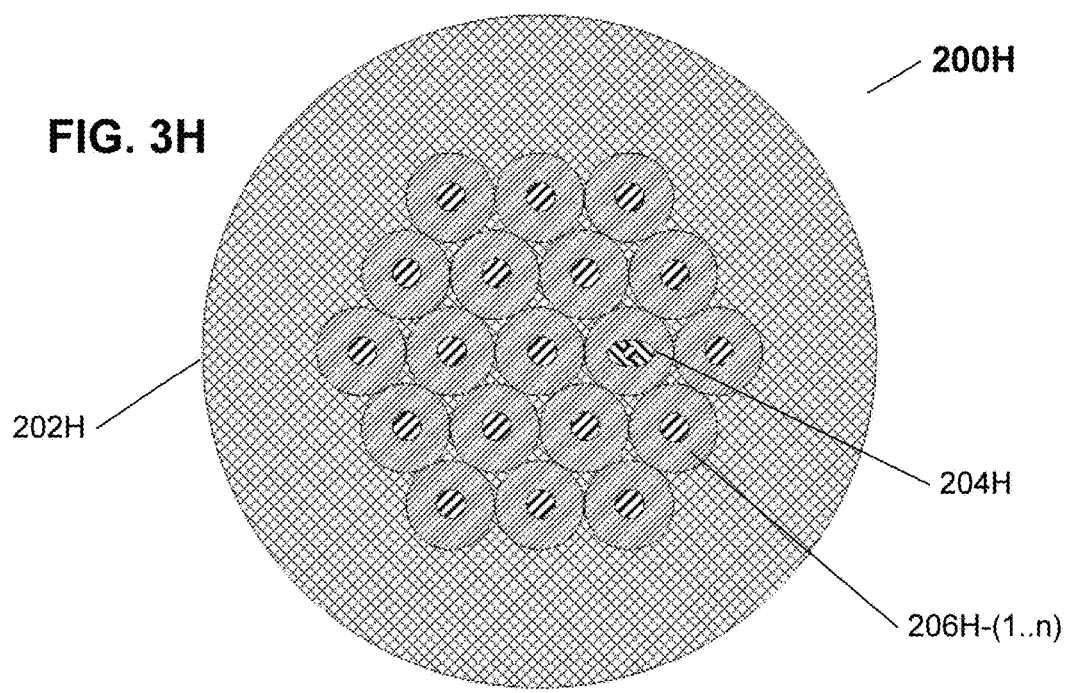
FIG. 3H is a schematic diagram of a cross-sectional view of a first alternative embodiment of the optical fiber coupler array of FIG. 3G, above, in which the at least one VC waveguide, illustrated therein by way of example as a side-channel off-center positioned single VC waveguide, comprises polarization maintaining properties and comprises a polarization axis that is aligned with respect to its transverse off-center location.
Figure 3I:
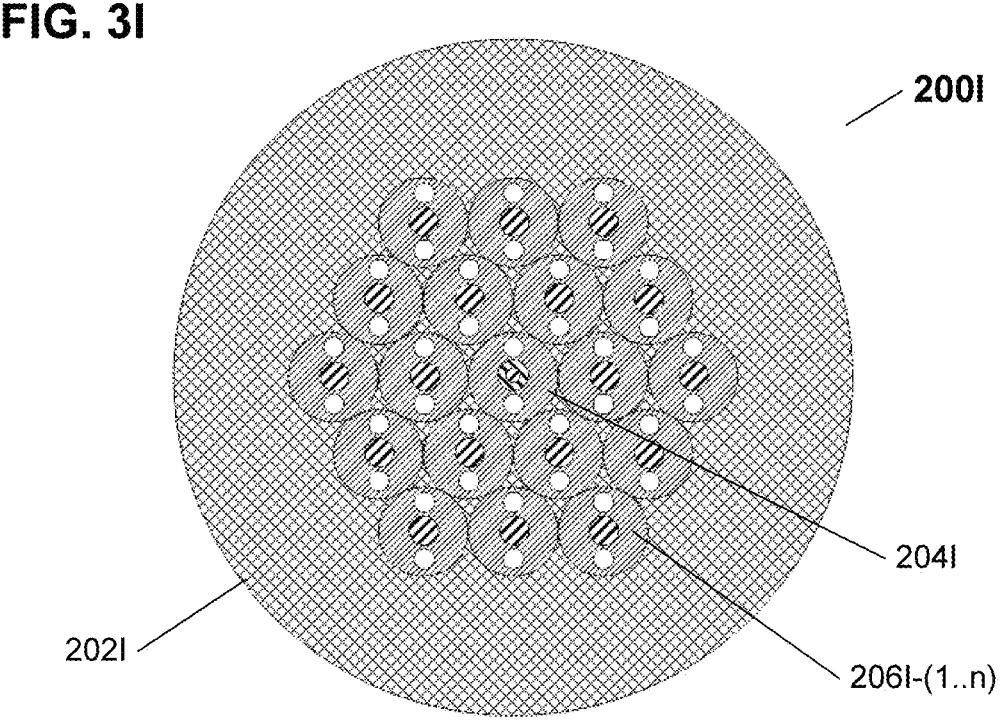
FIG. 3I is a schematic diagram of a cross-sectional view of a fourth alternative embodiment of the optical fiber coupler array of FIG. 3B, above, wherein each of the centrally positioned single VC waveguide, and the plural Non-VC waveguides, comprises polarization maintaining properties (shown by way of example only as being induced by rod stress members and which may readily and alternately be induced by various other stress or equivalent designs), and a corresponding polarization axis, where all of the polarization axes are aligned to one another.
Figure 3J:
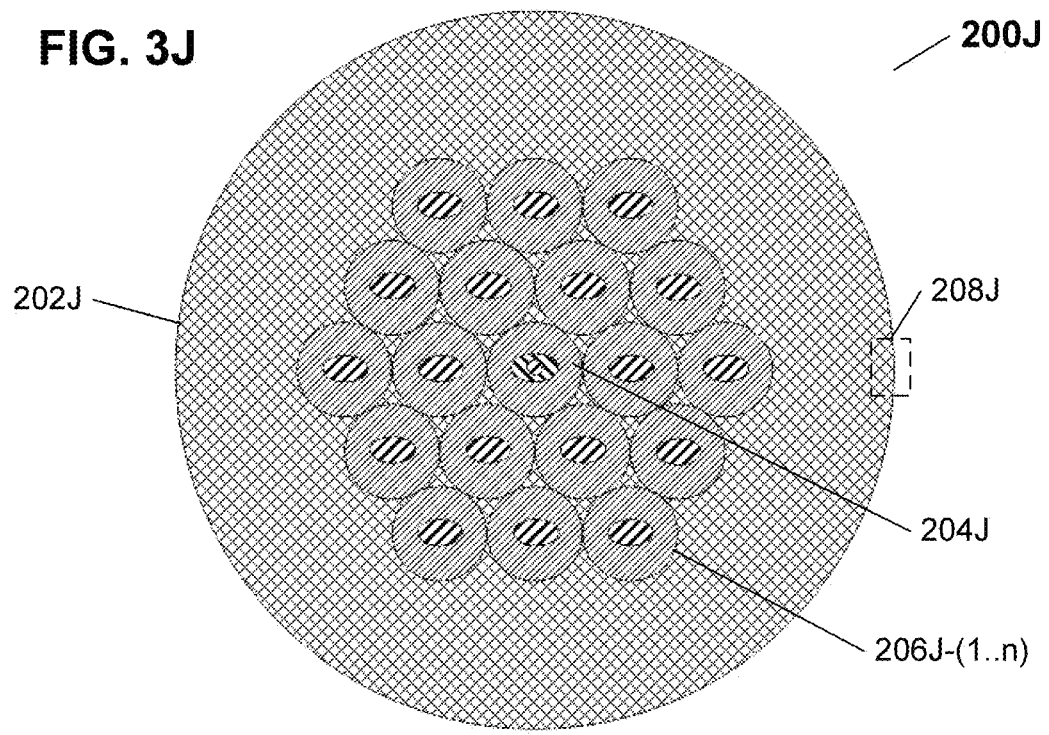
FIG. 3J is a schematic diagram of a cross-sectional view of a first alternative embodiment of the optical fiber coupler array of FIG. 3I, above, in which the polarization maintaining properties of all of the waveguides result only from a non-circular cross-sectional shape of each waveguide's core (or outer core in the case of the VC waveguide), shown by way of example only as being at least in part elliptical, and optionally comprising at least one waveguide arrangement indication element, positioned on an outer region of the single common housing structure, representative of the particular cross-sectional geometric arrangement of the optical coupler array's waveguides, such that a particular cross-sectional geometric waveguide arrangement may be readily identified from at least one of a visual and physical inspection of the single common coupler housing structure, the waveguide arrangement indication element being further operable to facilitate passive alignment of a second end of the optical coupler array to at least one optical device.
Figure 3K:
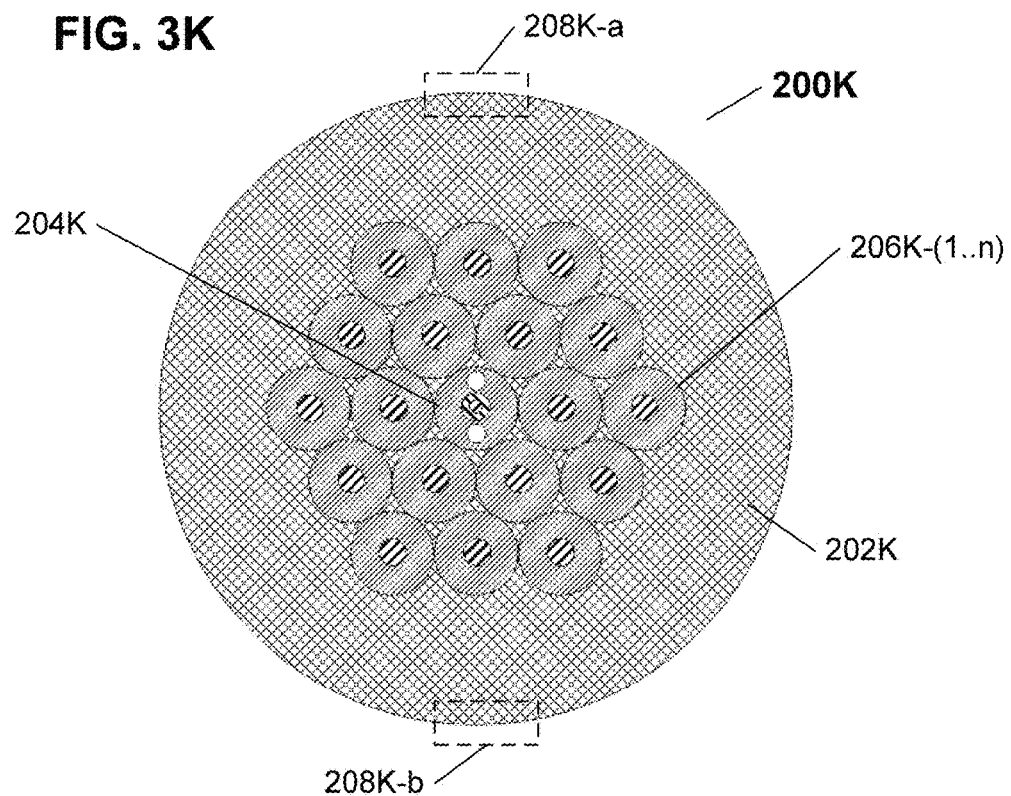
FIG. 3K is a schematic diagram of a cross-sectional view of a fifth alternative embodiment of the optical fiber coupler array of FIG. 3B, above, wherein the centrally positioned single VC waveguide, comprises polarization maintaining properties (shown by way of example only as being induced by rod stress members and which may readily and alternately be induced by various other stress or equivalent designs), and a corresponding polarization axis, and optionally comprising a plurality of optional waveguide arrangement indication elements of the same or of a different type, as described in connection with FIG. 3J.
Figure 3L:
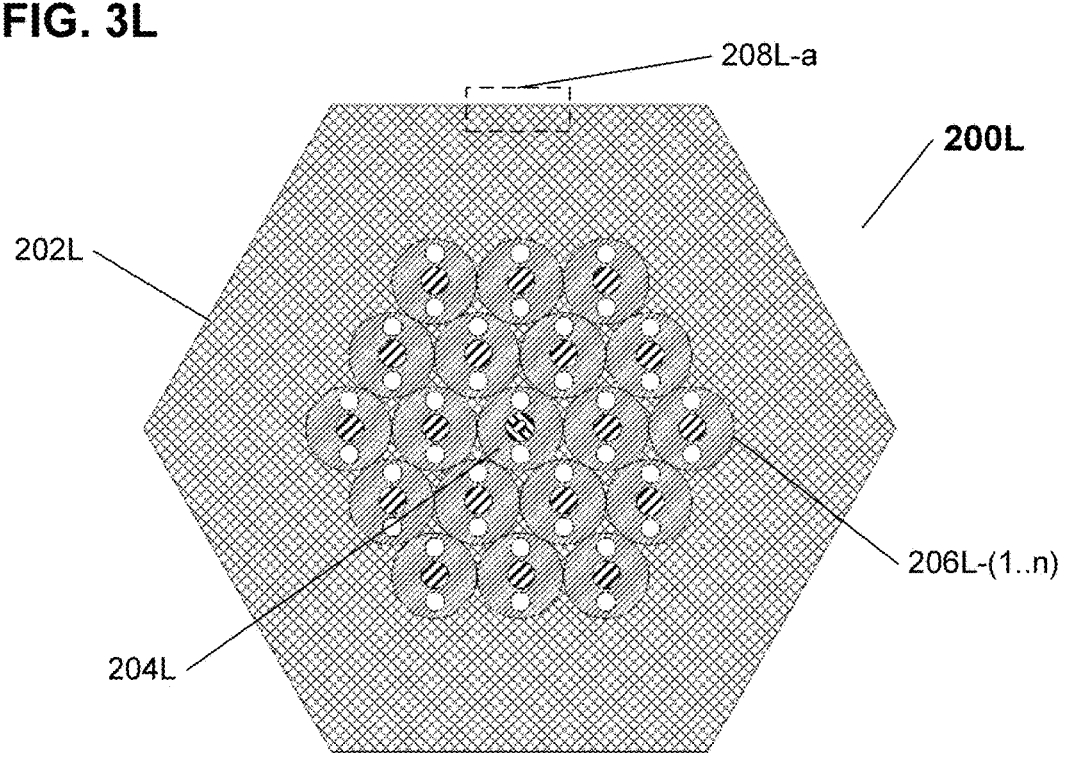
FIG. 3L is a schematic diagram of a cross-sectional view of a second alternative embodiment of the optical fiber coupler array of FIG. 3I, above, in which the single common housing structure comprises a cross section having a non-circular geometric shape (shown by way of example as a hexagon), and in which the polarization axes of the waveguides are aligned to one another and to the single common housing structure cross-section's geometric shape, and optionally further comprises a waveguide arrangement indication element, as described in connection with FIG. 3J.

In accordance with certain embodiments, a polarization axes alignment mode may comprise, but is not limited to, at least one of the following:
  axial alignment of a PM waveguide's polarization axis to the polarization axes of other PM waveguides in the optical coupler; when a PM waveguide is positioned off-center: axial alignment of a PM waveguide's polarization axis to its transverse cross-sectional (geometric) position within the optical coupler;
  when the single common housing structure of the optical coupler comprises a non-circular geometric shape (such as shown by way of example in FIG. 3L): axial alignment of a PM waveguide's polarization axis to a geometric feature of the common housing structure outer shape;
  in optical coupler embodiments comprising one or more waveguide arrangement indicators, described below, in connection with FIGS. 3J-3L: axial alignment of a PM waveguide's polarization axis to at least one geometric characteristic thereof;
  in optical coupler embodiments comprising at least one fiducial element 210A, as described above in connection with FIG. 3A: axial alignment of a PM waveguide's polarization axis to a geometric position of the at least one fiducial element 210A;

The selection of a specific type of polarization axes alignment mode for the various embodiments of the optical coupler is preferably governed by at least one axes alignment criterion, which may include, but which is not limited to: alignment of PM waveguides' polarization axes in a geometric arrangement that increases or maximizes PM properties thereof; and/or satisfying at least one requirement of one or more intended industrial application for the coupler array.

Referring now to FIG. 3H, a first alternative embodiment of the optical fiber coupler array 200G of FIG. 3G, above, is shown as a coupler array 200H, that comprises a single housing structure 202H, and at least one VC waveguide, shown in FIG. 3H by way of example as a PM VC waveguide 204H having polarization maintaining properties, and a plurality of Non-VC waveguides 206H-(1 ... n), with n being equal to 18 by way of example only. The PM VC waveguide 204H is positioned as a side-channel, off-set from the central longitudinal axis of the single common housing structure 202H, and comprises a polarization axis that is aligned, by way of example, with respect to the transverse off-center location of the PM VC waveguide 204H.

Referring now to FIG. 3I, a fourth alternative embodiment of the optical fiber coupler array 200B of FIG. 3B, above, is shown as a coupler array 200I, that comprises a single housing structure 202I, and at least one VC waveguide, shown in FIG. 3I by way of example as a PM VC waveguide 204I having polarization maintaining properties, and a plurality of PM Non-VC waveguides 206I-(1 ... n), with n being equal to 18 by way of example only, each also having polarization maintaining properties. The PM VC waveguide 204I is positioned along a central longitudinal axis of the common housing structure 202I, and circumferentially and symmetrically surrounded by proximal parallel plural PM Non-VC waveguides 206I-(1 ... n). By way of example, the coupler array 200I comprises a polarization axes alignment mode in which the polarization axes of each of the PM VC waveguide 204I and of the plural PM Non-VC waveguides 206I-(1 ... n) are aligned to one another. The PM properties of the PM VC waveguide 204I and of the plural PM Non-VC waveguides 206I-(1 ... n) are shown, by way of example only, as being induced by rod stress members (and which may readily and alternately be induced by various other stress, or equivalent designs)).

Referring now to FIG. 3J, a first alternative embodiment of the optical fiber coupler array 200I of FIG. 3I, above, is shown as a coupler array 200J, that comprises a single housing structure 202J, and at least one VC waveguide, shown in FIG. 3J by way of example as a PM VC waveguide 204J having polarization maintaining properties, and a plurality of PM Non-VC waveguides 206J-(1 ... n), with n being equal to 18 by way of example only, each also having polarization maintaining properties. The PM VC waveguide 204J is positioned along a central longitudinal axis of the common housing structure 202J, and circumferentially and symmetrically surrounded by proximal parallel plural PM Non-VC waveguides 206J-(1 ... n). The PM properties of the PM VC waveguide 204J and of the plural PM Non-VC waveguides 206J-(1 ... n) are shown, by way of example only, as resulting only from a non-circular cross-sectional shape (shown by way of example only as being at least in part elliptical), of each plural PM Non-VC waveguide 206J-(1 ... n) core (and from a non-circular cross-sectional shape of the outer core of the PM VC waveguide 204J).

The coupler array 200J optionally comprises at least one waveguide arrangement indication element 208J, positioned on an outer region of the common housing structure 202J, that is representative of the particular cross-sectional geometric arrangement of the optical coupler array 200J waveguides (i.e., of the PM VC waveguide 204J and of the plural PM Non-VC waveguides 206J-(1 ... n)), such that a particular cross-sectional geometric waveguide arrangement may be readily identified from at least one of a visual and physical inspection of the common coupler housing structure 202J that is sufficient to examine the waveguide arrangement indication element 208J. Preferably, the waveguide arrangement indication element 208J may be configured to be further operable to facilitate passive alignment of a second end of the optical coupler array 200J to at least one optical device (not shown).

The waveguide arrangement indication element 208J, may comprise, but is not limited to, one or more of the following, applied to the common housing structure 202J outer surface: a color marking, and/or a physical indicia (such as an groove or other modification of the common housing structure 202J outer surface, or an element or other member positioned thereon). Alternatively, the waveguide arrangement indication element 208J may actually comprise a specific modification to, or definition of, the cross-sectional geometric shape of the common housing structure 202J (for example, such as a hexagonal shape of a common housing structure 202L of FIG. 3L, below, or another geometric shape).

By way of example, the coupler array 200J may comprise a polarization axes alignment mode in which the polarization axes of each of the PM VC waveguide 204J and of the plural PM Non-VC waveguides 206J-(1 . . . n) are aligned to one another, or to the waveguide arrangement indication element 208J.

Referring now to FIG. 3K, a fifth alternative embodiment of the optical fiber coupler array 200B of FIG. 3B, above, is shown as a coupler array 200K, that comprises a single housing structure 202K, and at least one VC waveguide, shown in FIG. 3K by way of example as a PM VC waveguide 204K having polarization maintaining properties, and a plurality of Non-VC waveguides 206K-(1 . . . n), with n being equal to 18 by way of example only. The PM VC waveguide 204K is positioned along a central longitudinal axis of the common housing structure 202K, and circumferentially and symmetrically surrounded by proximal parallel plural PM Non-VC waveguides 206K-(1 . . . n). The PM properties of the PM VC waveguide 204K are shown, by way of example only, as being induced by rod stress members (and which may readily and alternately be induced by various other stress, or equivalent approaches)). The coupler array 200K, may optionally comprise a plurality of waveguide arrangement indication elements—shown by way of example only, as waveguide arrangement indication elements 208K-a and 208K-b, which may each be of the same, or of a different type, as described above, in connection with the waveguide arrangement indication element 208J of FIG. 3J.

Referring now to FIG. 3L, a second alternative embodiment of the optical fiber coupler array 200I of FIG. 3I, above, is shown as a coupler array 200L, that comprises a single housing structure 202L comprising a cross section having a non-circular geometric shape (shown by way of example as a hexagon), and at least one VC waveguide, shown in FIG. 3L by way of example as a PM VC waveguide 204L having polarization maintaining properties, and a plurality of PM Non-VC waveguides 206L-(1 . . . n), with n being equal to 18 by way of example only, each also having polarization maintaining properties. The PM VC waveguide 204L is positioned along a central longitudinal axis of the common housing structure 202L, and circumferentially and symmetrically surrounded by proximal parallel plural PM Non-VC waveguides 206L-(1 . . . n).

By way of example, the coupler array 200L comprises a polarization axes alignment mode in which the polarization axes of each of the PM VC waveguide 204L and of the plural PM Non-VC waveguides 206L-(1 . . . n) are aligned to one another, and to the common housing structure 202L cross-sectional geometric shape. The PM properties of the PM VC waveguide 204L and of the plural PM Non-VC waveguides 206L-(1 . . . n) are shown, by way of example only, as being induced by rod stress members (and which may readily and alternately be induced by various other stress, or equivalent designs)). The coupler array 200K, may optionally comprise a waveguide arrangement indication element 208L-a which may comprise any of the configurations described above, in connection with the waveguide arrangement indication element 208J of FIG. 3J.

Figure 4:
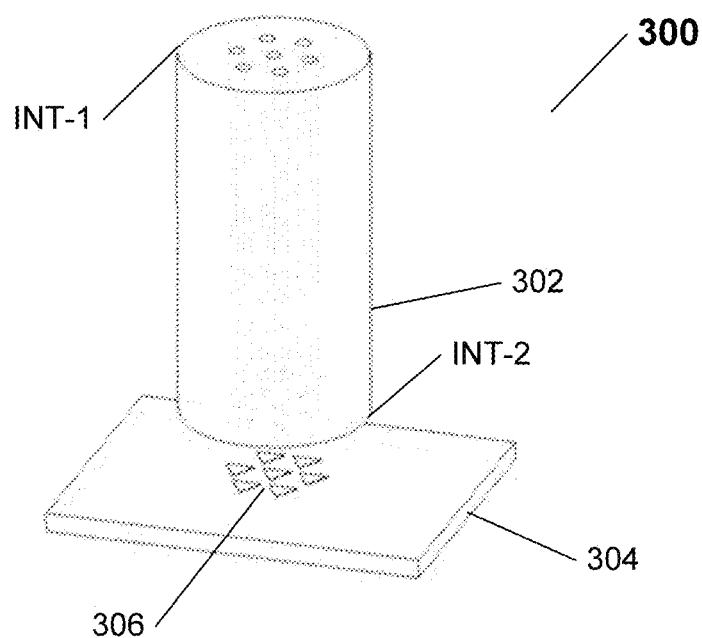
FIG. 4 is a schematic isometric view diagram illustrating an example connection of a second end (i.e. "tip") of the optical fiber coupler array, in the process of connecting to plural vertical coupling elements of an optical device in a proximal open air optical coupling alignment configuration, that may be readily shifted into a butt-coupled configuration through full physical contact of the optical fiber coupler array second end and the vertical coupling elements.

Referring now to FIG. 4, a second end 302 (i.e. "tip") of the optical fiber coupler array is shown, by way of example, as being in the process of connecting to plural vertical coupling elements 306 of an optical device 304 in a proximal open air optical coupling alignment configuration, that may be readily shifted into a butt-coupled configuration through full physical contact of the optical fiber coupler array second end 302 and the vertical coupling elements 306.

Figure 5:
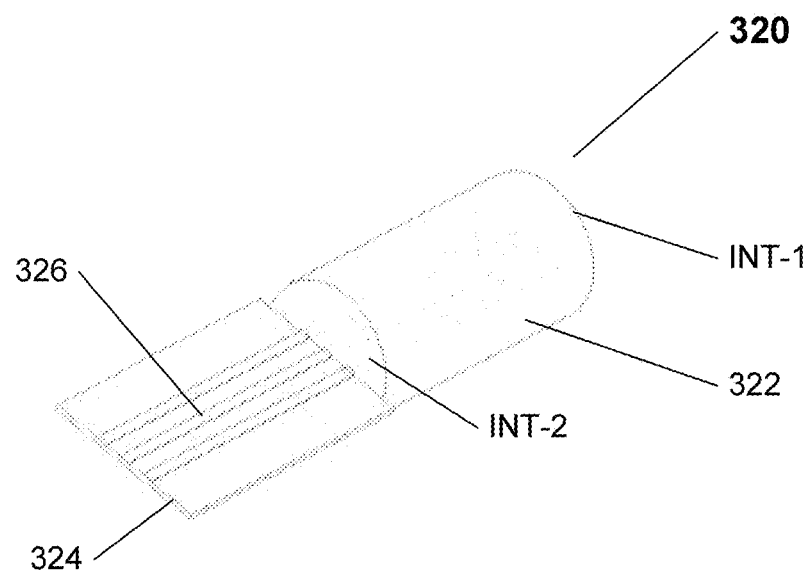
FIG. 5 is a schematic isometric view diagram illustrating an example connection of a second end (i.e. "tip") of the optical fiber coupler array connected to plural edge coupling elements of an optical device in a butt-coupled configuration, that may be readily shifted into one of several alternative coupling configurations, including a proximal open air optical coupling alignment configuration, and or an angled alignment coupling configuration.
Figure 6:
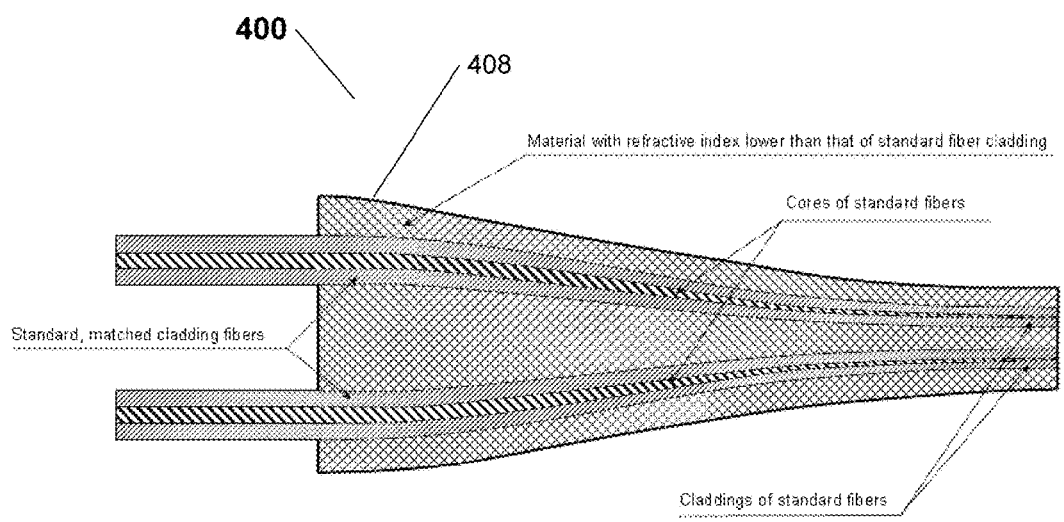
FIG. 6 is a schematic diagram of a cross-sectional view of a previously known optical fiber coupler having various drawbacks and disadvantages readily overcome by the various embodiments of the optical fiber coupler array of FIGS. 1A to 5.

Referring now to FIG. 5 a second end 322 (i.e. "tip") of the optical fiber coupler array is shown, by way of example, as being in the process of connecting to plural edge coupling elements 326 of an optical device 324 in a butt-coupled configuration, that may be readily shifted into one of several alternative coupling configuration, including a proximal open air optical coupling alignment configuration, and or an angled alignment coupling configuration.

In at least one alternative embodiment, the optical coupler array (i.e., such as optical coupler arrays 200D to 200L of FIGS. 3C to 3L) may be readily configured to pump optical fiber lasers, and/or optical fiber amplifiers (or equivalent devices). In a preferred embodiment thereof, a pumping-enabled coupler array comprises a central channel (i.e., waveguide), configured to transmit a signal (i.e., serving as a "signal channel") which will thereafter be amplified or utilized to generate lasing, and further comprises at least one additional channel (i.e., waveguide), configured to provide optical pumping functionality (i.e., each serving as a "pump channel"). In various example alternative embodiments thereof, the pumping-enabled coupler array may comprise the following in any desired combination thereof:

at least one of the following signal channels: a single mode signal channel configured for increased or optimum coupling to a single mode amplifying fiber at at least one predetermined signal or lasing wavelength, a multimode signal channel configured for increased or optimum coupling to a multimode amplifying fiber at at least one predetermined signal or lasing wavelength, and at least one of the following pumping channels: a single mode pumping channel configured for increased or optimum coupling to a single mode pump source at at least one predetermined pumping wavelength, a multimode pumping channel configured for increased or optimum coupling to a multimode pump source at at least one predetermined pumping wavelength.

Optionally, to increase or maximize pumping efficiency, the pumping-enabled coupler array may be configured to selectively utilize less than all the available pumping channels. It should also be noted that, as a matter of design choice, and without departing from the spirit of the invention, the pumping-enabled coupler array may be configured to comprise:

a. At least one signal channel, each disposed in a predetermined desired position in the coupler array structure;

b. At least one pumping channel, each disposed in a predetermined desired position in the coupler array structure; and c. Optionally—at least one additional waveguide for at least one additional purpose other than signal transmission or pumping (e.g., such as a fiducial marker for alignment, for fault detection, for data transmission, etc.)

Advantageously, the pump channels could be positioned in any transverse position within the coupler, including along the central longitudinal axis. The pump channels may also comprise, but are not limited to, at least one of any of the following optical fiber types: SM, MM, LMA, or VC waveguides. Optionally, any of the optical fiber(s) being utilized as an optical pump channel (regardless of the fiber type) in the coupler may comprise polarization maintaining properties.

In yet another example embodiment, the pumping-enabled coupler array may be configured to be optimized for coupling to a double-clad fiber—in this case, the signal channel of the coupler array would be configured or optimized for coupling to the signal channel of the double-clad fiber, while each of the at least one pumping channels would be configured or optimized to couple to the inner cladding of the double-clad fiber.

In essence, the optical coupler arrays, shown by way of example in various embodiments, may also be readily implemented as high density, multi-channel, optical input/output (I/O) for fiber-to-chip and fiber-to-optical waveguides. The optical fiber couplers may readily comprise at least the following features:

Dramatically reduced channel spacing and device footprint (as compared to previously known solutions)
Scalable channel count
All-glass optical path
Readily butt-coupled or spliced at their high density face without the need of a lens, air gap, or a beam spreading medium
May be fabricated through a semi-automated production process
Broad range of customizable parameters: wavelength, mode field size, channel spacing, array configuration, fiber type.

The optical fiber couplers may be advantageously utilized for at least the following applications, as a matter of design choice or convenience, without departing from the spirit of the invention:

Coupling to waveguides:
PIC or PCB-based (single-mode or multimode)
Multicore fibers
Chip edge (1D) or chip face (2D) coupling
NA optimized for the application, factoring in:
Packaging alignment needs
Chip processing needs/waveguide up-tapering
Polarization maintaining properties may be readily configured
Coupling to chip-based devices: e.g. VCSELs, photodiodes, vertically coupled gratings
Laser diode coupling
High density equipment Input/Output (I/O)

Figure 7:
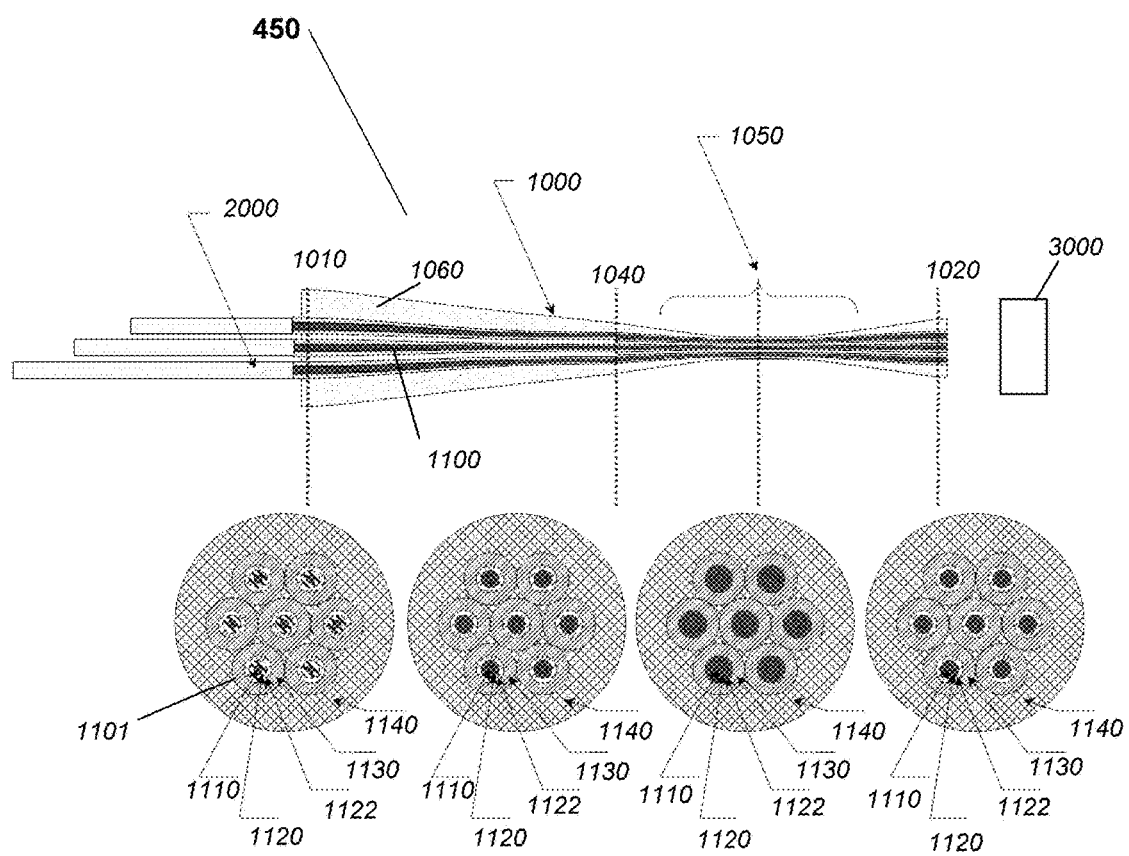
FIG. 7 is a schematic diagram, in various views, of a flexible pitch reducing optical fiber array (PROFA).

Accordingly, when implemented, the various example embodiments of the optical fiber couplers comprise at least the following advantages, as compared to currently available competitive solutions:

Unprecedented density
Low-loss coupling ($\leq 0.5$ dB)
Operational stability
Form factor support
Broad spectral range
Matching NA
Scalable channel count
Polarization maintenance Referring now to FIG. 7, at least one example embodiment of a flexible optical coupler array is shown as a flexible pitch reducing optical fiber array (PROFA) coupler 450. Although various features of the example PROFA coupler may be described with respect to FIG. 7, any feature described above can be implemented in any combination with a flexible PROFA coupler. For example, any of the features described with respect to FIGS. 1A-5 may be utilized in a flexible PROFA coupler. Further, any feature described with respect to FIGS. 1A-5 may be combined with any feature described with respect to FIG. 7.

With continued reference to FIG. 7, the example flexible PROFA coupler 450 shown in FIG. 7 can be configured for use in applications where interconnections with low crosstalk and sufficient flexibility to accommodate low profile packaging are desired. The vanishing core approach, described herein and in U.S. Patent Application Publication No. 2013/0216184, entitled "CONFIGURABLE PITCH REDUCING OPTICAL FIBER ARRAY", which is hereby incorporated herein in its entirety, allows for the creation of a pitch reducing optical fiber array (PROFA) coupler/interconnect operable to optically couple, for example, a plurality of optical fibers to an optical device (e.g., a PIC), which can be butt-coupled to an array of vertical grating couplers (VGCs). If the cross sectional structure of the coupler 450 has an additional layer of refractive index, N-2A, even lower than N2, as described herein and in U.S. Patent Application Publication No. 2013/0216184, the vanishing core approach can be utilized once more to reduce the outside diameter further without substantially compromising the channel crosstalk. This further reduction can advantageously provide certain embodiments with a flexible region which has a reduced cross section between a first and second end.

In some preferred embodiments, the difference (N-2A minus N-3) is larger than the differences (N-2 minus N-2A) or (N-1 minus N-2), resulting in a high NA, bend insensitive waveguide, when the light is guided by the additional layer having refractive index N-2A. Also, in some preferred embodiments, after the outside diameter of the coupler 450 is reduced along a longitudinal length from one end to form the flexible region, the outer diameter can then be expanded along the longitudinal length toward the second end, resulting in a lower NA waveguide with larger coupling surface area at the second end.

For example, as illustrated in FIG. 7, certain embodiments of an optical coupler array 450 can comprise an elongated optical element 1000 having a first end 1010, a second end 1020, and a flexible portion 1050 therebetween. The optical element 1000 can include a coupler housing structure 1060 and a plurality of longitudinal waveguides 1100 embedded in the housing structure 1060. The waveguides 1100 can be arranged with respect to one another in a cross-sectional geometric waveguide arrangement. In FIG. 7, the example cross-sectional geometric waveguide arrangements of the waveguides 1100 for the first end 1010, the second end 1020, and at a location within the flexible portion 1050 are shown. The cross-sectional geometric waveguide arrangement of the waveguides 1100 for an intermediate location 1040 between the first end 1010 and the flexible portion 1050 is also shown. As illustrated by the shaded regions within the cross sections and as will be described herein, light can be guided through the optical element 1000 from the first end 1010 to the second end 1020 through the flexible portion 1050. As also shown in FIG. 7, this can result in a structure, which maintains all channels discretely with sufficiently low crosstalk, while providing enough flexibility (e.g., with the flexible portion 1050) to accommodate low profile packaging.

The level of crosstalk and/or flexibility can depend on the application of the array. For example, in some embodiments, a low crosstalk can be considered within a range from −45 dB to −35 dB, while in other embodiments, a low crosstalk can be considered within a range from −15 dB to −5 dB. Accordingly, the level of crosstalk is not particularly limited. In some embodiments, the crosstalk can be less than or equal to −55 dB, −50 dB, −45 dB, −40 dB, −35 dB, −30 dB, −25 dB, −20 dB, −15 dB, −10 dB, 0 dB, or any values therebetween (e.g., less than or equal to −37 dB, −27 dB, −17 dB, −5 dB, etc.) In some embodiments, the crosstalk can be within a range from −50 dB to −40 dB, from −40 dB to −30 dB, from −30 dB to −20 dB, from −20 dB to −10 dB, from −10 dB to 0 dB, from −45 dB to −35 dB, from −35 dB to −25 dB, from −25 dB to −15 dB, from −15 dB to −5 dB, from −10 dB to 0 dB, any combinations of these ranges, or any ranges formed from any values from −55 dB to 0 dB (e.g., from −52 dB to −37 dB, from −48 dB to −32 dB, etc.).

The flexibility can also depend on the application of the array. For example, in some embodiments, good flexibility of the flexible portion 1050 can comprise bending of at least 90 degrees, while in other embodiments, a bending of at least 50 degrees may be acceptable. Accordingly, the flexibility is not particularly limited. In some embodiments, the flexibility can be at least 45 degrees, 50 degrees, 55 degrees, 60 degrees, 65 degrees, 70 degrees, 75 degrees, 80 degrees, 90 degrees, 100 degrees, 110 degrees, 120 degrees, or at least any value therebetween. In some embodiments, the flexible portion 1050 can bend in a range formed by any of these values, e.g., from 45 to 55 degrees, from 50 to 60 degrees, from 60 to 70 degrees, from 70 to 80 degrees, from 80 to 90 degrees, from 90 to 100 degrees, from 100 to 110 degrees, from 110 to 120 degrees, or any combinations of these ranges, or any ranges formed by any values within these ranges (e.g., from 50 to 65 degrees, from 50 to 85 degrees, from 65 to 90 degrees, etc.) In other embodiments, the flexible portion 1050 can bend more or less than these values. Bending can typically be associated with light scattering. However, various embodiments can be configured to bend as described herein (e.g., in one of the ranges described above) and achieve relatively low crosstalk as described herein (e.g., in one of the ranges described above).

In various applications, the flexible portion 1050 might not bend in use, however the flexibility can be desired for decoupling the first 1010 or second 1020 end from other parts of the coupler array 450. For example, the flexible portion 1050 of the flexible PROFA coupler 450 can provide mechanical isolation of the first end 1010 (e.g., a PROFA-PIC interface) from the rest of the PROFA, which results in increased stability with respect to environmental fluctuations, including temperature variations and mechanical shock and vibration.

In the example shown in FIG. 7, the coupler array 450 can be operable to optically couple with a plurality of optical fibers 2000 and/or with an optical device 3000. The optical fibers 2000 and optical device 3000 can include any of those described herein. The coupler array 450 can couple with the optical fibers 2000 via the plurality of waveguides 1100 at the first end 1010. In addition, the coupler array 450 can couple with the optical device 3000 via the plurality of waveguides 1100 at the second end 1020. As described herein, the plurality of waveguides 1100 can include at least one VC waveguide 1101. FIG. 7 illustrates all of the waveguides 1100 as VC waveguides. However, one or more Non-VC waveguides may also be used. In addition, FIG. 7 illustrates 7 VC waveguides, yet any number of VC and/or Non-VC waveguides can be used.

As also shown in the cross sections, each of the waveguides 1100 can be disposed at an individual corresponding cross-sectional geometric position, relative to other waveguides of the plurality of waveguides 1100. Although FIG. 7 shows a waveguide surrounded by 6 other waveguides, the cross-sectional geometric waveguide arrangement is not limited and can include any arrangement known in the art or yet to be developed including any of those shown in FIGS. 3A-3L.

As described herein, the VC waveguide 1101 can include an inner core (e.g., an inner vanishing core) 1110, an outer core 1120, and an outer cladding 1130 with refractive indices N-1, N-2, and N-3 respectively. As shown in FIG. 7, the VC waveguide 1101 can also include a secondary outer core 1122 (e.g., between the outer core 1120 and the outer cladding 1130) having refractive index N-2A. As the outer core 1120 can longitudinally surround the inner core 1110, the secondary outer core 1122 can longitudinally surround the outer core 1120 with the outer cladding 1130 longitudinally surrounding the secondary outer core 1122. In various embodiments, the relationship between the refractive indices of the inner core 1110, outer core 1120, secondary outer core 1122, and outer cladding 1130 can advantageously be N-1>N-2>N2-A>N-3. With such a relationship, each surrounding layer can serve as an effective cladding to the layers within it (e.g., the outer core 1120 can serve as an effective cladding to the inner core 1110, and the secondary outer core 1122 can serve as an effective cladding to the outer core 1120). Hence, the use of the secondary outer core 1122 can provide an additional set of core and cladding.

By including the secondary outer core 1122 with a refractive index N-2A, certain embodiments can achieve a higher NA (e.g., compared to without the secondary outer core 1122). In various embodiments, the difference (N-2A minus N-3) can be larger than the differences (N-2 minus N-2A) or (N-1 minus N-2) to result in a relatively high NA. Increasing NA can reduce the MFD, allowing for the channels (e.g., waveguides 1100) to be closer to each other (e.g., closer spacing between the waveguides 1100) without compromising crosstalk. Accordingly, the coupler array 450 can be reduced further in cross section (e.g., compared to without the secondary outer core 1122) to provide a reduced region when light is guided by the secondary outer core 1122. By providing a reduced region between the first end 1010 and the second end 1020, certain embodiments can include a flexible portion 1050 which can be more flexible than the regions proximal to the first end 1010 and the second end 1020.

For example, the inner core 1110 size, the outer core 1120 size, and the spacing between the waveguides 1100 can reduce (e.g., simultaneously and gradually in some instances) along the optical element 1000 from the first end 1010 to the intermediate location 1040 such that at the intermediate location 1040, the inner core 1110 size is insufficient to guide light therethrough and the outer core 1120 size is sufficient to guide at least one optical mode. In certain embodiments, each waveguide 1100 can have a capacity for at least one optical mode (e.g., single mode or multi-mode). For example, at the first end 1010, the VC waveguide 1101 can support a number of spatial modes (M1) within the inner core 1110. At the intermediate location 1040, in various embodiments, the inner core 1110 may no longer be able to support all the M1 modes (e.g., cannot support light propagation). However, in some such embodiments, at the intermediate location 1040, the outer core 1120 can be able to support all the M1 modes (and in some cases, able to support additional modes). In this example, light traveling within the inner core 1110 from the first end 1010 to the intermediate location 1040 can escape from the inner core 1110 into the outer core 1120 such that light can propagate within both the inner core 1110 and outer core 1120.

In addition, the outer core 1120 size, the secondary outer core 1122 size, and the spacing between the waveguides 1100 can reduce (e.g., simultaneously and gradually in some instances) along said optical element 1000, for example, from the intermediate location 1040 to the flexible portion 1050 such that at the flexible portion 1050, the outer core 1120 size is insufficient to guide light therethrough and the secondary outer core 1122 size is sufficient to guide at least one optical mode therethrough. In certain embodiments, at the intermediate location 1040, the VC waveguide 1101 can support all the M1 modes within the outer core 1120. At the flexible portion 1050, in various embodiments, the outer core 1120 may be no longer able to support all the M1 modes (e.g., cannot support light propagation). However, in some such embodiments, at the flexible portion 1050, the secondary outer core 1122 can be able to support all the M1 modes (and in some cases, able to support additional modes). In this example, light traveling within the outer core 1120 from the intermediate location 1040 to the flexible portion 1050 can escape from the outer core 1120 into the secondary outer core 1122 such that light can propagate within the inner core 1110, the outer core 1120, and secondary outer core 1122.

Furthermore, the outer core 1120 size, the secondary outer core 1122 size, and the spacing between the waveguides 1100 can expand (e.g., simultaneously and gradually in some instances) along the optical element 1000 from the flexible portion 1050 to the second end 1020 such that at the second end 1020, the secondary outer core 1122 size is insufficient to guide light therethrough and the outer core 1120 size is sufficient to guide at least one optical mode therethrough. In certain embodiments, at the second end 1020, in various embodiments, the secondary outer core 1122 may no longer be able to support all the M1 modes (e.g., cannot support light propagation). However, in some such embodiments, at the second end 1020, the outer core 1120 can be able to support all the M1 modes (and in some cases, able to support additional modes). In this example, light traveling within the secondary outer core 1122 from the flexible portion 1050 to the second end 1020 can return and propagate only within the inner core 1110 and the outer core 1120.

It would be appreciated that light travelling from the second end 1020 to the first end 1010 can behave in the reverse manner. For example, the outer core 1120 size, the secondary outer core 1122 size, and spacing between the waveguides 1100 can reduce (e.g., simultaneously and gradually in some instances) along the optical element 1000 from the second end 1020 to the flexible portion 1050 such that at the flexible portion 1050, the outer core 1120 size is insufficient to guide light therethrough and the secondary outer core 1122 size is sufficient to guide at least one optical mode therethrough.

The reduction in cross-sectional core and cladding sizes can advantageously provide rigidity and flexibility in a coupler array 450. Since optical fibers 2000 and/or an optical device 3000 can be fused to the ends 1010, 1020 of the coupler array 450, rigidity at the first 1010 and second 1020 ends can be desirable. However, it can also be desirable for coupler arrays to be flexible so that they can bend to connect with low profile integrated circuits. In certain embodiments, the flexible portion 1050 between the first 1010 and second 1020 ends can allow the first 1010 and second 1020 ends to be relatively rigid, while providing the flexible portion 1050 therebetween. The flexible portion can extend over a length of the optical element 1000 and can mechanically isolate the first 1010 and second 1020 ends. For example, the flexible portion 1050 can mechanically isolate the first end 1010 from a region between the flexible portion 1050 and the second end 1020. As another example, the flexible portion 1050 can mechanically isolate the second end 1020 from a region between the first end 1010 and the flexible portion 1050. Such mechanical isolation can provide stability to the first 1010 and second 1020 ends, e.g., with respect to environmental fluctuations, including temperature variations and mechanical shock and vibration. The length of the flexible portion 1050 is not particularly limited and can depend on the application. In some examples, the length can be in a range from 2 to 7 mm, from 3 to 8 mm, from 5 to 10 mm, from 7 to 12 mm, from 8 to 15 mm, any combination of these ranges, or any range formed from any values from 2 to 20 mm (e.g., 3 to 13 mm, 4 to 14 mm, 5 to 17 mm, etc.). In other examples, the length of the flexible portion 1050 can be shorter or longer.

At the same time, the flexible portion 1050 can provide flexibility. In many instances, the flexible portion 1050 can have a substantially similar cross-sectional size (e.g., the cross-sectional size of the waveguides 1100) extending over the length of the flexible portion 1050. In certain embodiments, the cross-section size at the flexible portion 1050 can comprise a smaller cross-sectional size than the cross-sectional size at the first 1010 and second 1020 ends. Having a smaller cross-sectional size, this flexible portion 1050 can be more flexible than a region proximal to the first 1010 and second 1020 ends. The smaller cross-sectional size can result from the reduction in core and cladding sizes. An optional etching post-process may be desirable to further reduce the diameter of the flexible length of the flexible PROFA coupler 450.

In some embodiments, the flexible portion 1050 can be more flexible than a standard SMF 28 fiber. In some embodiments, the flexible portion 1050 can bend at least 45 degrees, 50 degrees, 55 degrees, 60 degrees, 65 degrees, 70 degrees, 75 degrees, 80 degrees, 90 degrees, 100 degrees, 110 degrees, 120 degrees, or at least any value therebetween. In some embodiments, the flexible portion 1050 can bend in a range formed by any of these values, e.g., from 45 to 55 degrees, from 50 to 60 degrees, from 60 to 70 degrees, from 70 to 80 degrees, from 80 to 90 degrees, from 90 to 100 degrees, from 100 to 110 degrees, from 110 to 120 degrees, or any combinations of these ranges, or any ranges formed by any values within these ranges (e.g., from 50 to 65 degrees, from 50 to 85 degrees, from 65 to 90 degrees, etc.) In other embodiments, the flexible portion 1050 can bend more or less than these values. As described herein, in various applications, the flexible portion 1050 might not bend in use, however the flexibility can be desired for decoupling the first 1010 or second 1020 end from other parts of the coupler array 450.

The coupler array 450 can include a coupler housing structure 1060. For example, the coupler housing structure 1060 can include a common single coupler housing structure. In certain embodiments, the coupler housing structure 1060 can include a medium 1140 (e.g., having a refractive index N-4) surrounding the waveguides 1100. In some instances, N-4 is greater than N-3. In other examples, N-4 is equal to N-3. The medium 1140 can include any medium as described herein (e.g., pure-silica). The medium can also include glass such that the coupler array 450 can be an all-glass coupler array. The waveguides 1100 can be embedded within the medium 1040 of the housing structure 1060. In some examples, a total volume of the medium 1140 of the coupler housing structure 1060 can be greater than a total volume of all the inner and outer cores 1110, 1120, 1122 of the VC waveguides confined within the coupler housing structure 1060.

In some embodiments, each waveguide can couple to the optical fibers 2000 and/or optical device 3000 at a location inside, outside, or at a boundary region of the coupler housing structure 1060, e.g., as shown in FIGS. 1A to 2D. Because the optical fibers 2000 and optical device 3000 can be different at each end, the first end 1010 and the second end 1020 can each be configured for the optical fibers 2000 or optical device 3000 with which it is coupled. For example, the MFD of the VC waveguide at the first 1010 and/or second 1020 ends can be configured (e.g., using the sizes of the cores) to match or substantially match the MFD of the optical fiber 2000 or optical device 3000 with which it is coupled. In addition, the NA of the VC waveguide at the first 1010 and/or second 1020 ends can be configured (e.g., using the refractive indices) to match or substantially match the NA of the optical fiber 2000 or optical device 3000 with which it is coupled. The refractive indices can be modified in any way known in the art (e.g., doping the waveguide glass) or yet to be developed. In various embodiments, as described herein, the difference (N-1 minus N-2) can be greater than the difference (N-2 minus N-2A) such that the NA at the first end 1010 is greater than the NA at the second end 1020. In other embodiments, the difference (N-1 minus N-2) can be less than the difference (N-2 minus N-2A) such that the NA at the first end 1010 is less than the NA at the second end 1020. In yet other embodiments, the difference (N-1 minus N-2) can be equal to (N-2 minus N-2A) such that the NA at the first end 1010 is equal to the NA at the second end 1020. The VC waveguide can include any of the fiber types described herein including but not limited to a single mode fiber, a multi-mode fiber, and/or a polarization maintaining fiber.

The core and cladding (1110, 1120, 1122, 1130) sizes (e.g., outer cross-sectional diameters if circular or outer cross-sectional dimensions if not circular) are not particularly limited. In some embodiments, the inner 1110 and/or outer 1120 core sizes can be in a range from 1 to 3 microns, from 2 to 5 microns, from 4 to 8 microns, from 5 to 10 microns, any combination of these ranges, or any range formed from any values from 1 to 10 microns (e.g., 2 to 8 microns, 3 to 9 microns, etc.). However, the sizes can be greater or less. For example, the inner 1110 and/or outer 1120 core sizes can range from submicrons to many microns, to tens of microns, to hundreds of microns depending, for example, on the wavelength and/or number of modes desired.

In addition, the difference in the refractive indices (e.g., between N-1 and N-2, between N-2 and N-2A, and/or between N-2A and N-3) is not particularly limited. In some examples, the index difference can be in a range from $1.5 \times 10^{-3}$ to $2.5 \times 10^{-3}$, from $1.7 \times 10^{-3}$ to $2.3 \times 10^{-3}$, from $1.8 \times 10^{-3}$ to $2.2 \times 10^{-3}$, from $1.9 \times 10^{-3}$ to $2.1 \times 10^{-3}$, from $1.5 \times 10^{-3}$ to $1.7 \times 10^{-3}$, from $1.7 \times 10^{-3}$ to $1.9 \times 10^{-3}$, from $1.9 \times 10^{-3}$ to $2.1 \times 10^{-3}$, from $2.1 \times 10^{-3}$ to $2.3 \times 10^{-3}$, from $2.3 \times 10^{-3}$ to $2.5 \times 10^{-3}$, any combination of these ranges, or any range formed from any values from $1.5 \times 10^{-3}$ to $2.5 \times 10^{-3}$. In other examples, the index difference can be greater or less.

As described herein, the optical device 3000 can include a PIC. The PIC can include an array of VGCs. Also, as described in U.S. Patent Application Publication 2012/0257857, entitled "HIGH DENSITY OPTICAL PACKAGING HEADER APPARATUS", which is hereby incorporated herein in its entirety, multiple flexible PROFA couplers (such as the coupler 450), each having multiple optical channels, can be combined together to advantageously form an optical multi-port input/output (IO) interface. As such, an optical multi-port IO interface can include a plurality of optical coupler arrays, at least one of the optical coupler arrays can include an optical coupler array 450 as described herein.

As shown in FIG. 4, an optical fiber coupler array 300 can be used in a proximal open air optical coupling alignment configuration or in a butt-coupling coupling arrangement. In various embodiments, the optical fiber coupler array 300 can be a pitch reducing optical fiber array (PROFA) component as described herein.

Figure 8:
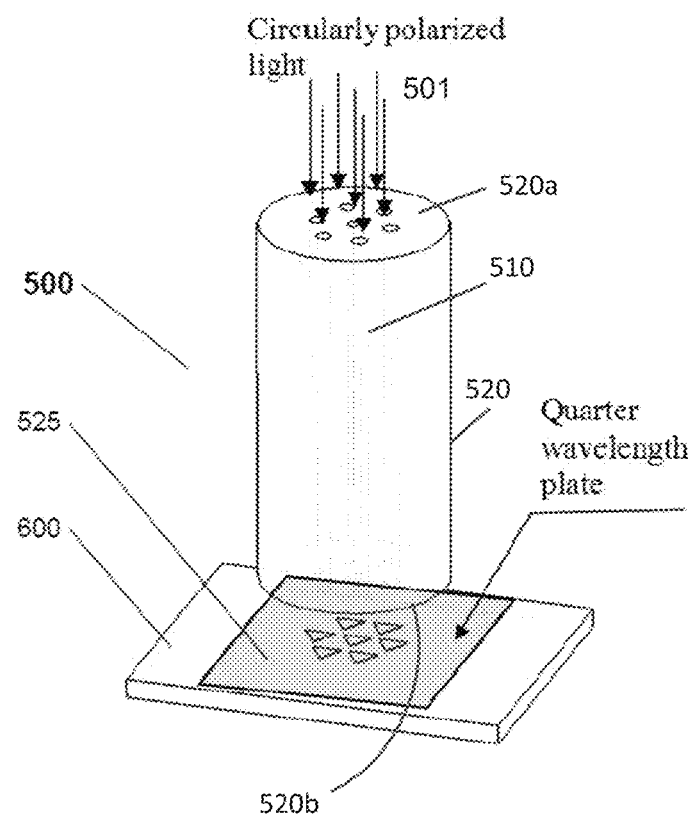
FIG. 8 is a schematic isometric view diagram, of an example embodiment of a polarization maintaining PROFA component shown in a butt-coupling coupling arrangement. In some instances, the polarization axes of the individual VC waveguides thereof can be aligned without the need to adjust the orientation of each individual VC waveguide.

Referring now to FIG. 8, at least one example embodiment of a polarization maintaining component is shown, e.g., in a butt-coupling coupling arrangement, as a polarization maintaining PROFA ("PM-PROFA") component 500 in which the polarization axes (e.g., all of the polarization axes in some instances) of the individual vanishing core ("VC") waveguides 510 thereof can be oriented and/or aligned without the need to adjust the orientation of each individual VC waveguide 510. Other types of optical coupler arrays can also be used (e.g., non-PROFA).

In various embodiments, linearly polarized ("LP") light in an optical fiber such as a polarization maintaining ("PM") optical fiber can be converted to circularly polarized ("CP") light 501, with the waveguides of the PROFA thereafter maintaining CP light (for example, such as a single mode ("SM"), or a spun fiber). In some examples, a SM fiber used in a waveguide can be configured to maintain CP light, e.g., a SM fiber not susceptible to bending. In additional examples, a spun fiber used in a waveguide can be configured to maintain CP light. If the light is then passed through a quarter wave ("QW") retarder 525, the polarization can become linear. The orientation of the LP light can be determined by the orientation of the QW retarder 525 and can be independent of the physical orientation of the waveguide 510.

With continued reference to FIG. 8, the optical coupler array 500 (e.g., a PM-PROFA in many instances) can include a PROFA as described herein having a plurality of longitudinal waveguides 510, where the longitudinal waveguides 510 can include a plurality of polarization maintaining fibers, such as the SM or spun optical fibers as described above. As described herein, the longitudinal waveguides 510 can include at least one VC waveguide (e.g., a plurality of VC waveguides in some instances). As also described herein, the longitudinal waveguides 510 can also include one or more non-vanishing core ("Non-VC") waveguides. In some embodiments, the waveguides 510 can be tapered and disposed in a housing structure as described herein (e.g., as shown in FIGS. 1A-2D and 7). The housing structure can also be tapered as described herein (e.g., housing structure 14A shown in FIG. 1A).

In an example embodiment, PM-PROFA component 500 includes a plurality of pigtails (not shown), each comprising a PM optical fiber in some examples. The plurality of pigtails can also comprise other types of optical fibers, e.g., other types of SM fibers. With continued reference to FIG. 8, the optical element 520 can have a first end 520a and a second end 520b. The first end 520a can be configured to receive light (e.g., operable to optically couple with a plurality of optical fibers including at least one PM optical fiber such as a plurality of PM optical fibers in some instances). As will be described herein, a linear to circular polarization converter can be disposed before one or more longitudinal waveguides 510 (e.g., at or adjacent the first end 520a in some instances). The linear to circular polarization converter can be configured to receive LP light (e.g., from one or more PM optical fibers) and transmit CP light 501 to and/or allow CP light to travel through the longitudinal waveguides 510. In some examples, linear to circular polarization converters can be implemented, e.g., in all the channels, between the PM pigtails and the VC waveguides 510. In some embodiments, the linear to circular polarization converter can be disposed outside the housing structure or can be disposed at least partially in the housing structure. In some instances, the linear to circular polarization converter can be disposed completely within the housing structure. When the linear to circular polarization converter is disposed at least partially in the housing structure, the linear to circular polarization converter can be disposed in an untapered region (e.g., before any tapering begins of the housing and/or of the waveguides). In some embodiments, the linear to circular polarization converter can be disposed in a tapered region of the housing, but before any tapering of the waveguides. In some other embodiments, the linear to circular polarization converter can be disposed in a tapered region of the housing, with some of the waveguides being tapered. In various embodiments, the linear to circular polarization converter comprises optical fibers that are untapered.

The second end 520b can be operable to optically couple with an optical device 600. A QW retarder 525 can be preferably positioned between the optical element 520 (e.g., the optical element end 520b) of the PM-PROFA component 500 and the optical device 600, which may comprise a photonic integrated circuit ("PIC") (or an equivalent thereof) as is shown by way of example in FIG. 8, an array of vertical grating couplers ("VGC"), or which may comprise free space optics.

In various example embodiments:
  (a) The QW retarder 525 may be physically attached to the optical element 520 of the PM-PROFA component 500 (e.g., at end 520b), or
  (b) The QW retarder 525 may be fabricated on the optical element 520 of the PM-PROFA component 500 tip (e.g., fabricated directly on end 520b such as a film deposited on the optical element 520), or
  (c) If the optical device 600 comprises a PIC (or an equivalent thereof), then the QW retarder 525 may be attached to the PIC surface or edge, or fabricated on the PIC surface or edge (e.g., such as a film deposited on the optical device 600 surface or edge), or
  (d) If the optical device 600 comprises free space optics, then QW retarder 525 may be a free-standing structure such as a plate.
  Alternative configurations are also possible.

The QW retarder 525 disposed at the second end 520b can be configured to receive the CP light 501 from at least one of the longitudinal waveguides 510 and transmit LP light to the optical device 600. In each of the above example embodiments (a) to (d) of the positioning of the QW retarder 525, the QW retarder 525 can be configured such that its optical axes are oriented appropriately to achieve a desirable orientation of the LP light. Accordingly, the transmitted LP light can have polarization axes oriented by the QW retarder 525. In some examples, the transmitted LP light from the different waveguides can have polarization axes aligned in the same direction by the QW retarder 525. In other examples, the transmitted LP light can have each polarization axis corresponding to each waveguide 510 oriented by the QW retarder 525 to achieve the desirable orientation of the LP light for each corresponding waveguide 510. Advantageously, in various embodiments, the orientation of the transmitted LP light can be independent of physical orientations of the waveguides 510. Thus, the polarization axes of the light received from the individual waveguides 510 can be oriented without the need to adjust the orientation of the individual waveguides 510.

By way of example, in operation of the PM-PROFA component 500, if CP light is launched into the waveguide channels of PM-PROFA component 500, and the VC waveguide channels 510 thereof comprise optical fibers maintaining CP light, then the waveguides 510 can transmit CP light without substantial alteration of the polarization state. CP light waves exiting the optical element 520 of the PM-PROFA component 500 from the channels (e.g., from all the channels in many instances) can then be passed through the QW retarder 525 and thereafter become LP light waves with the desired oriented (e.g., identically oriented in some instances) polarization. This can result in increased (e.g., optimum in some cases) light coupling to the array of VGCs of the optical device 600, as shown. (For the sake of simplicity, neither the PM-PROFA component 500 PM pigtails, nor the CP converters are shown in FIG. 8).

Figure 9:
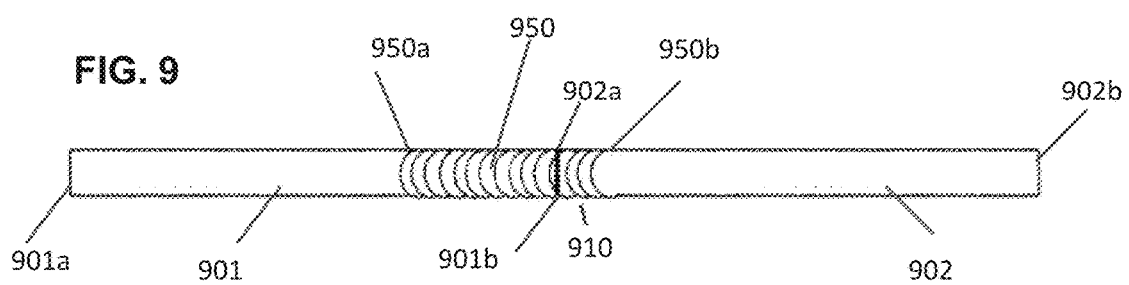
FIG. 9 is a schematic diagram of a side view of an example embodiment of a chiral fiber circular polarizer.

U.S. Patent Application Publication No. 2012/0189241, entitled "CHIRAL FIBER CIRCULAR POLARIZER," which is expressly incorporated by reference herein, teaches that linearly polarized ("LP") light in a polarization maintaining ("PM") optical fiber can be converted to circularly polarized ("CP") light. Referring now to FIG. 9, an example embodiment of a chiral fiber polarizer 910 which can be used as a linear to circular polarization converter is shown. The example polarizer 910 can include a first optical fiber section 901, e.g., a first linear-polarization maintaining (PM) optical fiber section, having a first fiber first PM end 901a and a second PM end 901b, and a sequentially positioned second optical fiber section 902, e.g., a single mode (SM), spun optical fiber, or other CP maintaining fiber, having a first SM end 902a and a second SM end 902b. The second PM end 901b can be connected to the first SM end 902a (e.g., via a fusion splice therebetween, or by other equivalent or similar or different technique) at a junction point, such that the sequentially positioned and connected PM 901 and SM 902 optical fiber sections, thereby form a continuous fiber structure in some embodiments. The PM optical fiber section 901 may comprise any PM fiber such as PANDA fiber or bow-tie fiber, while the SM optical fiber section 902 may comprise any SM fiber, such as a conventional SMF fiber, spun fiber, or other CP maintaining fiber.

In various embodiments, the continuous fiber structure can be axially twisted, within a twisting region 950 along its longitudinal axis. The twisting region 950 can include a twist profile, e.g., pursuant to a predefined twist profile in some instances. In at least one embodiment, the twisting region 950 can comprise a first region end 950a disposed between the first PM end 901a and the second PM end 901h of the PM optical fiber section 901, and also can comprise a second region end 950h positioned between the first SM end 902a and the second SM end 902b of the SM optical fiber section 902. The twist profile may comprise any desired twist profile, such as a uniform twist, an accelerated twist (for example in accordance with a mathematical function, such as a power function), etc. Furthermore, the twist profile may be readily selected and configured to enable the chiral fiber polarizer 910 to achieve desired extinction ratio parameters (e.g., to increase or maximize the extinction ratio, to decrease or minimize the extinction ratio, or to achieve any desired value therebetween). In various embodiments, the extinction ratio can be the ratio of the generated optical power level with a light source on to the generated optical power with the light source off. The extinction ratio can be expressed as a fraction, percentage, or decimal. The extinction ratio is not particularly limited and in some instances, can depend on the use or application.

The example circular chiral fiber polarizer 910 can be operable to convert linearly polarized LP light to circularly polarized CP light, may be advantageously fabricated in an "in-fiber" manner, and may also serve as an interface between a sequentially, positioned optical fibers, such as a polarization maintaining (PM) fiber and a single mode (SM) fiber. Accordingly, the example PM PROFA 500 shown in FIG. 8 can include a chiral fiber circular polarizer 910 as shown in FIG. 9 to convert LP light from an optical fiber such as a PM fiber to CP light before the light enters the plurality of longitudinal waveguides 510 (e.g., at or adjacent the first end 520*a* of the optical element in some instances). In some embodiments, the first optical fiber section 901 can be formed with at least a part of the PM fiber or can be connected to the PM fiber. In one example, at least one of the PM fiber pigtails described with respect to FIG. 8 can be provided as the PM optical fiber section 901 shown in FIG. 9. In addition, the second optical fiber section 902 can be formed with at least a part of the longitudinal waveguide or can be connected to the longitudinal waveguide. In one example, a section of at least one of the plurality of longitudinal waveguides 510 shown in FIG. 8 can be provided as the SM fiber shown in FIG. 9. Accordingly, the twisting region 950 shown in FIG. 9 can have a first region end 950*a* disposed proximal, at, or within the portion of the PM fiber pigtail and a second region end 950*b* disposed proximal, at, or within a section of the longitudinal wavelength 510.

While in some preferred embodiments thereof, the PM-PROFA component 500 can comprise CP converters, and a PROFA component, it should be noted that in other example embodiments, other alternative method of launching CP light, as well other types of 1D or 2D optical fiber arrays may be readily utilized as a matter of convenience or design choice, without departing from the spirit of the invention.

Also, in an alternative embodiment (not shown), the PM-PROFA component 500 can comprise at least one non-VC waveguide, a CP converter may be inserted between a PM optical fiber and the at least one non-VC waveguide 510.

The quarter wave retarder 525 need not be limited to thick "plate" like structures and may be thin, flexible, and/or a thin film or thin film stack or other physical structures with the appropriate birefringent or polarization properties. In various alternative embodiments, the QW retarder 525 may be a film deposited using the glancing angle deposition ("GLAD") technique (or an equivalent thereof or other method). In some embodiments, the QW retarder 525 may comprise a polymeric liquid crystal film, or it may comprise another film or plate having equivalent properties. For increased (or optimum in some cases) light coupling, it may be also desirable to reduce (or minimize in some instances) the thickness of the QW retarder 525, preferably to a value below several wavelengths of light (e.g., in the range from 100 nm to 1 mm, 200 nm to 1 mm, 300 nm to 1 mm, 400 nm to 1 mm, 500 nm to 1 mm, 600 nm to 1 mm, 400 nm to 700 nm, 1000 nm to 2000 nm, 1000 nm to 5000 nm, or any range formed by any of these values such as 100 nm to 5000 nm, 400 nm to 2000 nm, 5000 nm to 1 mm, etc.). In some embodiments, the thickness of the QW retarder 525 can be scalable with the wavelength of use (e.g., 1310 nm, 1550 nm, etc.). Optionally, a QW retarder 525 that is larger in area than would be required by the coupling area, such that it covers a majority or the entire surface of the optical device 600, thus can serve as an advantageous protective layer. In yet another alternative embodiment, the CP converters and the QW retarder 525 can be configured to operate in the same desired spectral range.

Referring now to FIG. 10, an example method 1200 of controlling polarization orientation between a plurality of optical fibers, e.g, comprising at least one PM optical fiber in some instances, and an optical device is shown. As shown in operational block 1210, the method 1200 can include providing an optical element 520 comprising a plurality of longitudinal waveguides 510. The optical element 520 can include any of the optical elements of an optical coupler array as described herein. For example, the longitudinal waveguides 510 may include a VC waveguide (e.g., a plurality of VC waveguides in some examples). The waveguides 510 waveguides 510 may also include one or more Non-VC waveguides. The waveguides 510 can be PM or SM fibers.

As shown in operational block 1220, the method 1200 can further include positioning a linear to circular polarization converter between the plurality of optical fibers and at least one of the plurality of longitudinal waveguides 510 of the optical element 520 such that the linear to circular polarization converter can be configured to receive LP light (e.g., from at least one optical fiber) and can be configured to transmit CP light to and/or allow CP light to travel through the at least one of the plurality of longitudinal waveguides 510.

As shown in operational block 1230, the method 1200 can further include positioning a QW retarder 525 between the optical element 520 and the optical device 600 such that the QW retarder 525 can be configured to receive the CP light from the at least one of the plurality of longitudinal waveguides 510 and transmit LP light to the optical device.

In some embodiments, the method 1200 can include physically attaching the QW retarder 525 to the optical element 520. In some other embodiments, the method 1200 can include fabricating the QW retarder 525 on the optical element 520. For example, the QW retarder 525 can include a film, such as a liquid crystal film. The film can be deposited on the optical element 520. In some embodiments, the method 1200 can also include physically attaching the QW retarder 525 to the optical device 600. In some other embodiments, the method 1200 can include fabricating the QW retarder 525 on the optical device 600. For example, the QW retarder 525 can be a film, such as a liquid crystal film. The film can be deposited on the optical device 600. In yet other embodiments, the method 1200 can include positioning the QW retarder 525 as a free-standing structure such as a plate, e.g., for use with free space optics.

The method 1200 can include orienting the polarization axes of transmitted LP light by the QW retarder 525. In some instances, the polarization axes of the transmitted LP light from different light guides can be aligned in the same direction.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. An optical coupler array for optical coupling of a plurality of optical fibers to an optical device, wherein at least one of the plurality of optical fibers comprises a polarization maintaining optical fiber, comprising:
   an elongated optical element having a first end operable to optically couple with the plurality of optical fibers and a second end operable to optically couple with said optical device, comprising:
      a common single coupler housing structure;
      a plurality of longitudinal waveguides each positioned at a predetermined spacing from one another, each having a capacity for at least one optical mode of a predetermined mode field profile, each embedded in said common single coupler housing structure, wherein at least one of said plurality of longitudinal waveguides is a vanishing core waveguide, each said at least one vanishing core waveguide comprising:
         an inner vanishing core, having a first refractive index (N-1), and having a first inner core size (ICS-1) at said first end, and a second inner core size (ICS-2) at said second end;
         an outer core, longitudinally surrounding said inner core, having a second refractive index (N-2), and having a first outer core size (OCS-1) at said first end, and a second outer core size (OCS-2) at said second end, and
         an outer cladding, longitudinally surrounding said outer core, having a third refractive index (N-3), a first cladding size at said first end, and a second cladding size at said second end; and
   wherein said common single coupler housing structure comprises a medium having a fourth refractive index (N-4) surrounding said plurality of longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium of said common single coupler housing structure, is greater than a total volume of all said vanishing core waveguides inner cores and said outer cores confined within said common single coupler housing structure, and wherein said first inner vanishing core size (ICS-1), said first outer core size (OCS-1), and said predetermined spacing between said plurality of longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said second inner vanishing core size (ICS-2) is selected to be insufficient to guide light therethrough, and said second outer core size (OCS-2) is selected to be sufficient to guide at least one optical mode, such that:
      light traveling from said first end to said second end escapes from said inner vanishing core into said corresponding outer core proximally to said second end,
      light traveling from said second end to said first end moves from said outer core into said corresponding inner vanishing core proximally to said first end,
   wherein a linear to circular polarization converter is positioned between the at least one polarization maintaining optical fiber and a corresponding one of said plurality of longitudinal waveguides, and
   wherein a quarter wave plate comprising a predefined polarization orientation is positioned between said second end and the optical device, such that light traveling from the at least one polarization maintaining optical fiber to said optical device changes its polarization from linear polarization, oriented in accordance with the orientation of said at least one polarization maintaining optical fiber, first to circular polarization, and then back to linear polarization, oriented in accordance with the orientation of said quarter wave plate.

2. An optical coupler array for optical coupling of a plurality of optical fibers to an optical device, wherein at least one of the plurality of optical fibers comprises a polarization maintaining optical fiber, comprising:
   an optical element having a first end operable to optically couple with the plurality of optical fibers and a second end operable to optically couple with said optical device; and
   a plurality of longitudinal waveguides, each positioned at a predetermined spacing from one another, each having a capacity for at least one optical mode of a predetermined mode field profile;
   wherein a linear to circular polarization converter is positioned between the at least one polarization maintaining optical fiber and a corresponding one of said plurality of longitudinal waveguides, and
   wherein a quarter wave plate comprising a predefined polarization orientation is positioned between said second end and the optical device, such that light traveling from the at least one polarization maintaining optical fiber to said optical device changes its polarization from linear polarization, oriented in accordance with the orientation of said at least one polarization maintaining optical fiber, first to circular polarization, and then back to linear polarization, oriented in accordance with the orientation of said quarter wave plate.

3. An optical coupler array, comprising:
   an optical element having a first end configured to receive light, the optical element further having a second end operable to optically couple with an optical device, the optical element comprising a plurality of longitudinal waveguides;
   a linear to circular polarization converter disposed before at least one of the plurality of longitudinal waveguides, the converter configured to receive linearly polarized light and transmit circularly polarized light to the at least one of the plurality of longitudinal waveguides;
   a quarter wave retarder disposed at the second end configured to receive the circularly polarized light from the at least one of the plurality of longitudinal waveguides and transmit linearly polarized light to the optical device; and
   a coupler housing,
   wherein the linear to circular polarization converter is disposed at least partially within the coupler housing, wherein the coupler housing comprises a tapered region, and wherein the linear to circular polarization converter is disposed in an untapered region of the coupler housing.

4. The optical coupler array of claim 3, wherein the quarter wave retarder is attached to the optical element.

5. The optical coupler array of claim 3, wherein the quarter wave retarder is attached to the optical device.

6. The optical coupler array of claim 3, wherein the quarter wave retarder is a free-standing plate.

7. The optical coupler array of claim 3, wherein the quarter wave retarder comprises a film.

8. The optical coupler array of claim 7, wherein the film is a liquid crystal film.

9. The optical coupler array of claim 3, wherein the transmitted linearly polarized light has polarization axes oriented by the quarter wave retarder.

10. The optical coupler array of claim 9, wherein the transmitted linearly polarized light for different longitudinal waveguides has polarization axes aligned in the same direction by the quarter wave retarder.

11. The optical coupler array of claim 9, wherein orientation of the transmitted linearly polarized light for different longitudinal waveguides is independent of physical orientations of the plurality of longitudinal waveguides.

12. The optical coupler array of claim 3, wherein the plurality of longitudinal waveguides comprises a plurality of polarization maintaining fibers configured to maintain circularly polarized light.

13. The optical coupler array of claim 3, wherein the plurality of longitudinal waveguides comprises at least one vanishing core waveguide.

14. The optical coupler array of claim 3, wherein the linear to circular polarization converter comprises:
a twisting region comprising a twist profile, the twisting region having a first region end and a second region end, the first region end disposed proximal, at, or within a portion of a first optical fiber, the second region end disposed proximal, at, or within a section of a second optical fiber.

15. The optical coupler array of claim 14, wherein the first or second optical fiber is spliced to the at least one of the plurality of longitudinal waveguides.

16. The optical coupler array of claim 14, wherein the twist profile comprises a uniform twist.

17. The optical coupler array of claim 14, wherein the twist profile comprises an accelerated twist configured in accordance with a power function.

18. The optical coupler array of claim 14, wherein the first or second optical fiber comprises a polarization maintaining fiber.

19. The optical coupler array of claim 3, wherein the linear to circular polarization converter is disposed before any tapering of the plurality of longitudinal waveguides.

20. The optical coupler array of claim 3, wherein the linear to circular polarization converter comprises optical fibers that are untapered.

* * * * *